United States Patent
Ito

(10) Patent No.: US 11,829,036 B2
(45) Date of Patent: Nov. 28, 2023

(54) OPTICALLY ANISOTROPIC MULTILAYER PRODUCT AND METHOD FOR PRODUCING SAME

(71) Applicant: ZEON CORPORATION, Tokyo (JP)

(72) Inventor: Manabu Ito, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 110 days.

(21) Appl. No.: 17/753,636

(22) PCT Filed: Sep. 8, 2020

(86) PCT No.: PCT/JP2020/033911
§ 371 (c)(1),
(2) Date: Mar. 10, 2022

(87) PCT Pub. No.: WO2021/065377
PCT Pub. Date: Apr. 8, 2021

(65) Prior Publication Data
US 2022/0340815 A1  Oct. 27, 2022

(30) Foreign Application Priority Data

Sep. 30, 2019  (JP) ................................ 2019-179969

(51) Int. Cl.
*G02F 1/13363* (2006.01)
*G02B 5/30* (2006.01)

(52) U.S. Cl.
CPC ....... *G02F 1/13363* (2013.01); *G02B 5/3016* (2013.01); *G02B 5/3083* (2013.01)

(58) Field of Classification Search
CPC ............... G02B 5/3083; G02F 1/13363; G02F 1/133638
See application file for complete search history.

(56) References Cited

U.S. PATENT DOCUMENTS

| | | | | |
|---|---|---|---|---|
| 2007/0279553 | A1* | 12/2007 | Yoda | G02F 1/13363 349/96 |
| 2008/0170294 | A1* | 7/2008 | Kuroda | G02B 5/3083 359/489.02 |
| 2010/0157204 | A1 | 6/2010 | Ichihashi et al. | |
| 2014/0142266 | A1 | 5/2014 | Sakamoto et al. | |
| 2015/0079380 | A1* | 3/2015 | Muramatsu | C09K 19/2028 252/299.61 |
| 2016/0068756 | A1 | 3/2016 | Moriya et al. | |
| 2016/0131809 | A1* | 5/2016 | Takeda | G02F 1/13363 349/194 |
| 2016/0145363 | A1 | 5/2016 | Sakamoto et al. | |
| 2016/0291373 | A1* | 10/2016 | Iida | G02F 1/13363 |
| 2018/0313990 | A1 | 11/2018 | Muramatsu et al. | |
| 2020/0088924 | A1 | 3/2020 | Muramatsu et al. | |
| 2021/0072444 | A1 | 3/2021 | Muramatsu et al. | |

FOREIGN PATENT DOCUMENTS

| | | |
|---|---|---|
| JP | 2008282009 A | 11/2008 |
| JP | 2015200861 A | 11/2015 |
| JP | 2016051178 A | 4/2016 |
| WO | 2012147904 A1 | 11/2012 |

OTHER PUBLICATIONS

Apr. 5, 2022, International Preliminary Report on Patentability issued in International Patent Application No. PCT/JP2020/033911.

* cited by examiner

*Primary Examiner* — Jia X Pan
(74) *Attorney, Agent, or Firm* — KENJA IP LAW PC

(57) ABSTRACT

An optically anisotropic multi-layered product including an optically anisotropic layer (Sm), and an optically anisotropic layer (N), wherein: the optically anisotropic layer (Sm) is an optically anisotropic layer that contains a liquid crystal compound (A-Sm) fixed in a state in which a smectic liquid crystal phase is exhibited; the optically anisotropic layer (N) is an optically anisotropic layer that contains a liquid crystal compound (A-N) fixed in a state in which a nematic liquid crystal phase is exhibited; and the optically anisotropic layer (Sm) and the optically anisotropic layer (N) have a common in-plane slow axis direction. A method for producing the optically anisotropic multi-layered product is also provided.

6 Claims, No Drawings

OPTICALLY ANISOTROPIC MULTILAYER PRODUCT AND METHOD FOR PRODUCING SAME

FIELD

The present invention relates to an optically anisotropic multi-layered product and a production method therefor.

BACKGROUND

As a material constituting an optical member such as a phase difference film, there is used an optically anisotropic layer that is a structural product which has a layered structure and optical anisotropy.

As an example of a method for producing an optically anisotropic layer, there is known a method of giving orientation to a liquid crystal composition containing a liquid crystal compound and curing the oriented liquid crystal composition (for example, Patent Literatures 1 to 3).

CITATION LIST

Patent Literature

Patent Literature 1: Japanese Patent Application Laid-Open No. 2008-282009 A (Corresponding Publication: U.S. Patent Application Publication No. 2010/157204)
Patent Literature 2: Japanese Patent Application Laid-Open No. 2015-200861 A (Corresponding Publication: U.S. Patent Application Publication No. 2015/079380)
Patent Literature 1: Japanese Patent Application Laid-Open No. 2016-051178 A (Corresponding Publication: U.S. Patent Application Publication No. 2016/068756)

SUMMARY

Technical Problem

An optically anisotropic layer formed with a liquid crystal composition is sometimes insufficient in durability. For example, an optically anisotropic layer is sometimes significantly altered in its phase difference when placed under the durability test conditions of 100 hours at 85° C. Regarding an in-plane retardation Re, when such a phase difference as mentioned above is considered as a decrease in Re, such a decrease in Re is sometimes called an "Re drop". The Re drop can become a factor in reducing the durability of an optically anisotropic layer when it is used as a constituent in a high heat-generating device such as a display device.

Therefore, an object of the present invention is to provide a structural product including an optically anisotropic layer formed with a liquid crystal composition and which has high durability against heat load, and a production method therefor.

Solution to Problem

The present inventor conducted research for solving the aforementioned problem. As a result, in the course of such research, the present inventor obtained previously unknown knowledge that a cured product of a certain type of liquid crystal composition can sometimes cause a positive Re drop and can sometimes cause a negative Re drop. The present inventor further conceived that when a plurality of layers that have different Re drop-causing properties coexist in an optically anisotropic multi-layered product, the Re drops can negate each other, thereby improving the durability of the optically anisotropic multi-layered product. The present invention has been accomplished on the basis of such idea.

That is, according to the present invention, the followings are provided.

<1> An optically anisotropic multi-layered product comprising an optically anisotropic layer (Sm), and an optically anisotropic layer (N), wherein:
the optically anisotropic layer (Sm) is an optically anisotropic layer that contains a liquid crystal compound (A-Sm) fixed in a state in which a smectic liquid crystal phase is exhibited;
the optically anisotropic layer (N) is an optically anisotropic layer that contains a liquid crystal compound (A-N) fixed in a state in which a nematic liquid crystal phase is exhibited; and
the optically anisotropic layer (Sm) and the optically anisotropic layer (N) have a common in-plane slow axis direction.

<2> The optically anisotropic multi-layered product according to <1>, wherein:
the liquid crystal compound (A-Sm) and the liquid crystal compound (A-N) are the same liquid crystal compound (A-SmN); and
the liquid crystal compound (A-SmN) is a compound that is capable of exhibiting a smectic liquid crystal phase and a nematic liquid crystal phase.

<3> The optically anisotropic multi-layered product according to <2>, wherein the liquid crystal compound (A-SmN) is a reverse wavelength dispersible polymerizable liquid crystal compound.

<4> The optically anisotropic multi-layered product according to <3>, wherein the liquid crystal compound (A-SmN) is a compound represented by the following formula (I):

(Chemical formula 1)

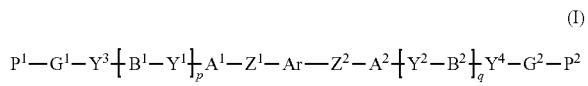

in the formula (I),
Ar represents a group represented by the following formula (III-2)

(Chemical formula 2)

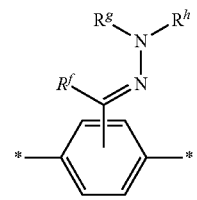

$R^f$ represents a group selected from a hydrogen atom and an alkyl group of 1 to 6 carbon atoms,
$R^g$ represents a group selected from the group consisting of a hydrogen atom, and an organic group of 1 to 30 carbon atoms optionally having a substituent,
$R^h$ represents an organic group having one or more aromatic rings selected from the group consisting of an aromatic hydrocarbon ring of 6 to 30 carbon atoms and an aromatic heterocyclic ring of 2 to 30 carbon atoms, $Z^1$ and $Z^2$ each independently represent one selected from the group consisting of a single bond, —O—, —O—CH$_2$—, —CH$_2$—O—, —O—CH$_2$—CH$_2$—, —CH$_2$—CH$_2$—O—, —C(=O)—O—, —O—C(=O)—, —C(=O)—S—, —S—C(=O)—, —NR$^{21}$—C(=O)—, —C(=O)—NR$^{21}$—, —CF$_2$—O—, —O—CF$_2$—, —CH$_2$—CH$_2$—, —CF$_2$—CF$_2$—, —O—CH$_2$—CH$_2$—O—, —CH=CH—C(=O)—O—, —O—C(=O)—CH=CH—, —CH$_2$—C(=O)—O—, —O—C(=O)—CH$_2$—, —CH$_2$—O—C(=O)—, —C(=O)—O—CH$_2$—, —CH$_2$—CH$_2$—C(=O)—O—, —O—C(=O)—CH$_2$—CH$_2$—, —CH$_2$—CH$_2$—O—C(=O)—, —C(=O)—O—CH$_2$—CH$_2$—, —CH=CH—, —N=CH—, —CH=N—, —N=C(CH$_3$)—, —C(CH$_3$)=N—, —N=N—, and —C≡C—, and $R^{21}$ each independently represents a hydrogen atom or an alkyl group of 1 to 6 carbon atoms, $A^1$, $A^2$, $B^1$, and $B^2$ each independently represent a group selected from the group consisting of a cyclic aliphatic group optionally having a substituent, and an aromatic group optionally having a substituent, $Y^1$ to $Y^4$ each independently represent one selected from the group consisting of a single bond, —O—, —C(=O)—, —C(=O)—O—, —O—C(=O)—, —NR$^{22}$—C(=O)—, —C(=O)—NR$^{22}$—, —O—C(=O)—O—, —NR$^{22}$—C(=O)—O—, —O—C(=O)—NR$^{22}$—, and —NR$^{22}$—C(=O)—NR$^{23}$—, and $R^{22}$ and $R^{23}$ each independently represent a hydrogen atom or an alkyl group of 1 to 6 carbon atoms, $G^1$ and $G^2$ each independently represent an organic group selected from the group consisting of an aliphatic hydrocarbon group of 1 to 20 carbon atoms; and a group in which one or more of methylene groups (—CH$_2$—) contained in an aliphatic hydrocarbon group of 3 to 20 carbon atoms is substituted with —O— or —C(=O)—, the hydrogen atom contained in the organic group of $G^1$ and $G^2$ is optionally substituted with an alkyl group of 1 to 5 carbon atoms, an alkoxy group of 1 to 5 carbon atoms, or a halogen atom, with a proviso that methylene groups (—CH$_2$—) at both ends of $G^1$ and $G^2$ are not substituted with —O— or —C(=O)—, $P^1$ and $P^2$ each independently represent a polymerizable group, and p and q each independently represent 0 or 1.

<5> The optically anisotropic multi-layered product according to <4>, wherein the liquid crystal compound (A-SmN) is a compound represented by the following formula (A-2):

<6> A method for producing the optically anisotropic multi-layered product according to any one of <1> to <5>, comprising the steps of:

curing a liquid crystal composition (Sm) containing the liquid crystal compound (A-Sm) in a state in which a smectic liquid crystal phase is exhibited to obtain the optically anisotropic layer (Sm);

curing a liquid crystal composition (N) containing the liquid crystal compound (A-N) in a state in which a nematic liquid crystal phase is exhibited to obtain the optically anisotropic layer (N); and bonding the optically anisotropic layer (Sm) and the optically anisotropic layer (N) together.

Advantageous Effects of Invention

According to the present invention, there is provided a structural product including an optically anisotropic layer formed with a liquid crystal composition and having high durability against heat load, and a production method therefor.

DESCRIPTION OF EMBODIMENTS

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the film is not particularly limited, and is usually 100,000 times or less the width.

In the following description, a slow axis of a film or layer represents a slow axis in the plane of the film or layer (in-plane slow axis), unless otherwise specified.

In the following description, an in-plane retardation Re of a layer is a value represented by Re=(nx−ny)×d unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, perpendicular to the direc- (Chemical formula 3)

(A-2)

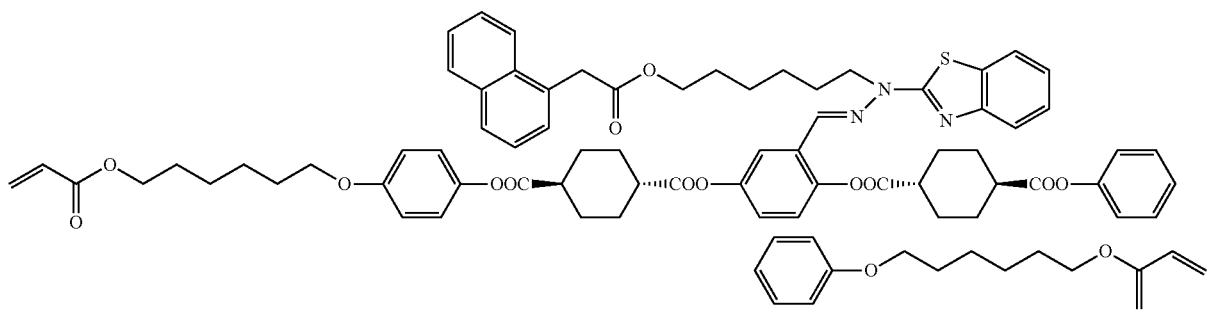

tion giving nx, nz represents a refractive index in the thickness direction of the layer, and d represents the thickness of the layer. The measurement wavelength is 590 nm unless otherwise specified.

In the following description, the term "reverse wavelength dispersion property" refers to a property in which the in-plane retardation Re(450) at a wavelength of 450 nm, the in-plane retardation Re (550) at a wavelength of 550 nm, and the in-plane retardation Re (650) at a wavelength of 650 nm satisfy the following formula (1), unless otherwise specified. The material with a reverse wavelength dispersion property preferably satisfies both the formula (1) and formula (2) below.

$$Re(450)/Re(550)<1.00 \qquad (1)$$

$$Re(650)/Re(550)>1.00 \qquad (2)$$

In the following description, the term "forward wavelength dispersion property" refers to a property in which Re(450), Re (550), and Re(650) satisfy the following formula (1'), unless otherwise specified. The material with a forward wavelength dispersion property preferably satisfies both the following formula (1') and formula (2').

$$Re(450)/Re(550)>1.00 \qquad (1')$$

$$Re(650)/Re(550)<1.00 \qquad (2')$$

In the following description, a direction of an element being "parallel", "perpendicular" or "orthogonal" may allow an error within the range of not impairing the advantageous effects of the present invention, for example, within a range of ±3°, ±2°, or ±1°, unless otherwise specified.

(1. Optically Anisotropic Multi-Layered Product: Properties of Liquid Crystal Compounds (A-Sm), (A-N), and (A-SmN))

The optically anisotropic multi-layered product according to the present invention includes an optically anisotropic layer (Sm) and an optically anisotropic layer (N). The optically anisotropic layer (Sm) is an optically anisotropic layer that contains a liquid crystal compound (A-Sm) fixed in a state in which a smectic liquid crystal phase is exhibited. The optically anisotropic layer (N) is an optically anisotropic layer that contains a liquid crystal compound (A-N) fixed in a state in which a nematic liquid crystal phase is exhibited.

In general, a liquid crystal compound is a compound that is capable of exhibiting a liquid crystal phase when the compound itself is oriented or when oriented while being formulated to a composition. In the present application, the "liquid crystal composition" refers to a material consisting only of a liquid crystal compound or a composition containing a liquid crystal compound and other optional components, which is in a fluid state and is capable of exhibiting a liquid crystal phase by itself.

In the present application, the "fixed" liquid crystal compound is a liquid crystal compound that is not in a fluid state such as a liquid state and a liquid crystal state, but in a solid state with the orientation of the liquid crystal phase maintained.

As the liquid crystal compound (A-Sm) and the liquid crystal compound (A-N), a polymerizable liquid crystal compound may be adopted. The polymerizable liquid crystal compound is a liquid crystal compound that is capable of being polymerized in a liquid crystal composition in a state in which a liquid crystal phase is exhibited so as to become a polymer which maintains the molecular orientation in the liquid crystal phase. When the liquid crystal compound (A-Sm) and the liquid crystal compound (A-N) are the polymerizable liquid crystal compound, a polymerization reaction of the liquid crystal compound in the liquid crystal composition containing either one of the liquid crystal compounds brings about curing of the liquid crystal composition and thereby fixing of such a liquid crystal compound is achieved. As a result of such fixing by polymerization, the "fixed liquid crystal compound" does not exist as the monomer molecule of the liquid crystal compound itself in the optically anisotropic layer, but exists as a polymerized unit in the polymer obtained as a result of the polymerization reaction of the monomer.

The liquid crystal compound (A-Sm) is a liquid crystal compound that is capable of exhibiting a smectic liquid crystal phase, and the liquid crystal compound (A-N) is a liquid crystal compound that is capable of exhibiting a nematic liquid crystal phase. That is, the liquid crystal compound (A-Sm) is capable of being oriented in such a manner as to exhibit a smectic liquid crystal phase by selecting the orientation conditions, and the liquid crystal compound (A-N) is capable of being oriented in such a manner as to exhibit a nematic liquid crystal phase by selecting the orientation conditions.

As generally known, the smectic liquid crystal phase is a liquid crystal phase in which the directors of molecules of a liquid crystal compound are oriented in a certain direction that is not random but is parallel or almost parallel, and which has a layered structure including multiple layers along a plane that is perpendicular or oblique to such an orientation direction. In the present invention, the smectic liquid crystal phase may include, in addition to the most common smectic A layer, various smectic liquid crystal phases such as a smectic C layer, a smectic CA layer, and a smectic C* layer. On the other hand, as generally known, the nematic liquid crystal phase is a liquid crystal phase in which the directors of molecules of a liquid crystal compound are oriented in such a certain direction, but which does not have the aforementioned layered structure.

The liquid crystal compound (A-Sm) used as a material of the optically anisotropic layer (Sm) and the liquid crystal compound (N) used as a material of the optically anisotropic layer (N) may be different compounds, but also may be the same liquid crystal compound (A-SmN). From the viewpoints of the ease of production and improvement of durability, the liquid crystal compound (A-Sm) and the liquid crystal compound (N) are preferably the same liquid crystal compound (A-SmN). When the liquid crystal compound (A-Sm) and the liquid crystal compound (A-N) are the same liquid crystal compound (A-SmN), the liquid crystal compound (A-SmN) is a compound that is capable of exhibiting a smectic liquid crystal phase and a nematic liquid crystal phase. Since the liquid crystal compound (A-SmN) is capable of exhibiting a smectic liquid crystal phase and a nematic liquid crystal phase, fixing is enabled in both states, one in which a smectic liquid crystal phase is exhibited and one in which a nematic liquid crystal phase is exhibited. Hereinafter, the liquid crystal compound (A-Sm), the liquid crystal compound (A-N), and the liquid crystal compound (A-SmN) are collectively referred to as a "liquid crystal compound (A)".

In general, a liquid crystal composition causes phase transition from a solid phase (crystal phase) to an isotropic phase with temperature increase, and from an isotropic phase to a solid phase with temperature decrease. Then, a liquid crystal composition is capable of exhibiting a liquid crystal phase during one or both of the phase transition process from a solid phase to an isotropic phase and the phase transition process from an isotropic phase to a solid phase. In such phase transitions, the liquid crystal compound (A-SmN) has both a temperature range in which a smectic liquid crystal phase is exhibited and a temperature range in which a nematic liquid crystal phase is exhibited, within the temperature range in which liquid crystal phases are exhibited. The temperature range in which the liquid crystal compound (A-SmN) exhibits a smectic liquid crystal phase is usually, but not limited to, lower than the temperature range in which a nematic liquid crystal phase is exhibited. The observation of such phase transitions with temperature increase and decrease and the detection of the phase transition temperature may be performed by one or a combination of two or more of observation through a microscope, observation of a correlation between a change in optical properties (for example, an Re(450)/Re(550) value) and a temperature, and differential scanning calorimetry.

The liquid crystal compound (A) may be a forward wavelength dispersible polymerizable liquid crystal compound or a reverse wavelength dispersible polymerizable liquid crystal compound, and is preferably a reverse wavelength dispersible polymerizable liquid crystal compound. The reverse wavelength dispersible polymerizable liquid crystal compound is a polymerizable liquid crystal compound which has a reverse wavelength dispersion property.

The liquid crystal compound with a reverse wavelength dispersion property is a liquid crystal compound capable of exhibiting a reverse wavelength dispersion birefringence. The liquid crystal compound capable of exhibiting a reverse wavelength dispersion birefringence refers to a liquid crystal compound that exhibits a reverse wavelength dispersion birefringence when a layer of the liquid crystal compound is formed and the liquid crystal compound is oriented in the layer.

The liquid crystal compound with a forward wavelength dispersion property is a liquid crystal compound capable of exhibiting a forward wavelength dispersion birefringence. The liquid crystal compound capable of exhibiting a forward wavelength dispersion birefringence refers to a liquid crystal compound that exhibits a forward wavelength dispersion birefringence when a layer of the liquid crystal compound is formed and the liquid crystal compound is oriented in the layer.

The wavelength dispersion property of a birefringence exhibited by a liquid crystal compound can be usually checked by observing the wavelength dispersion property of a birefringence exhibited by a layer of a homogeneously oriented liquid crystal compound. The homogeneously oriented liquid crystal compound is a liquid crystal compound obtained by forming a layer of the liquid crystal compound and rendering the direction of the maximum refractive index in the refractive index ellipsoid of the molecule of the liquid crystal compound in the layer to be oriented in one direction that is parallel to the plane of the layer.

Specifically, by the following method, it may be confirmed that the polymerizable liquid crystal compound has a reverse wavelength dispersion property.

(1) Preparing a liquid crystal composition containing a polymerizable liquid crystal compound, a surfactant, and a solvent.

(2) Applying the liquid crystal composition onto a substrate, which have been imparted with an orientation regulating force on its surface, to form a coating film, and drying the coating film to form a layer of the polymerizable liquid crystal compound.

(3) Orientation of the polymerizable liquid crystal compound is effected in the layer of the polymerizable liquid crystal compound, if necessary with a treatment by heating the layer of the polymerizable liquid crystal compound, and measuring the in-plane retardations Re(450), Re(550), and Re(650) at wavelengths of 450 nm, 550 nm, and 650 nm of the layer of the polymerizable liquid crystal compound to confirm Re(450)/Re(550)<1.00 (or Re(450)/Re(550)<1.00 and Re(650)/Re(550)>1.00).

Preferably, the optically anisotropic layer (Sm) and the optically anisotropic layer (N) differ in Re drop behaviors. Such a difference in Re drop behaviors may be evaluated by performing heat treatment to the layers under heating conditions of 100 hours at 85° C. and observing a change in in-plane retardation Re of the layers caused by such heat treatment. The measurement wavelength of Re can be, for example, 590 nm. The Re drop value ReD (%) may be calculated from an Re value Re0 before treatment and an Re value Re1 after treatment according to the formula: ReD=((Re1−Re0)/Re0)×100. Specifically, it is preferable that, as the result of such heat treatment, the Re drop value ReD(Sm) of the optically anisotropic layer (Sm) is positive, while the Re drop value ReD(N) of the optically anisotropic layer (N) is negative. When a liquid crystal compound that provides an optically anisotropic layer exhibiting such Re drop behaviors is adopted to constitute the optically anisotropic multi-layered product according to the present invention, particularly high durability can be obtained. When the liquid crystal compound (A-Sm) and the liquid crystal compound (A-N) are the same liquid crystal compound (A-SmN), the liquid crystal compound (A-SmN) is preferably a compound in which the Re drop behaviors differ between when the liquid crystal compound is fixed in a state in which a smectic liquid crystal phase is exhibited and when the liquid crystal compound is fixed in a state in which a nematic liquid crystal phase is exhibited.

Preferably, the optically anisotropic layer (Sm) and the optically anisotropic layer (N) differ in wavelength dispersion change behaviors when heat treatment is performed. Such a difference in wavelength dispersion change behaviors may be evaluated by performing heat treatment to the layers under heating conditions of 100 hours at 85° C. and observing a change in Re(450)/Re(550) value of the layers caused by such heat treatment. Specifically, it is preferable that, as a result of such heat treatment, the Re(450)/Re(550) value of the optically anisotropic layer (Sm) increases, and the Re(450)/Re(550) value of the optically anisotropic layer (N) decreases. When a liquid crystal compound that exhibits such wavelength dispersion change behaviors is adopted to constitute the optically anisotropic multi-layered product according to the present invention, particularly high durability can be obtained. When the liquid crystal compound (A-Sm) and the liquid crystal compound (A-N) are the same liquid crystal compound (A-SmN), the liquid crystal compound (A-SmN) is preferably such that the wavelength dispersion change behaviors when heat treatment is performed differ between when the liquid crystal compound is fixed in a state in which a smectic liquid crystal phase is exhibited and when the liquid crystal compound is fixed in a state in which a nematic liquid crystal phase is exhibited.

Regarding a group of reverse wavelength dispersible polymerizable liquid crystal compounds, a portion of the group tends to have a positive ReD(Sm) and a negative ReD(N), and tends to cause increase in the Re(450)/Re(550) value of a cured product (Sm) by heat treatment and to cause decrease in the Re(450)/Re (550) value of a cured product (N) by heat treatment.

Furthermore, a further portion thereof has the property of exhibiting a smectic liquid crystal phase and a nematic liquid crystal phase. Therefore, the present invention can be easily implemented by appropriately selecting a compound which has such a property from such a group of reverse wavelength dispersible polymerizable liquid crystal compounds. Specific examples of such a compound will be described later.

As each of the liquid crystal compounds (A), one type may be used solely, and two or more types may also be used in combination at any ratio.

The molecular weight of each of the liquid crystal compounds (A) is preferably 300 or more, more preferably 500 or more, and particularly preferably 800 or more, and preferably 2,000 or less, more preferably 1,700 or less, and particularly preferably 1,500 or less. With the use of the liquid crystal compound (A) which has a molecular weight in such a range, a desired orientation can be easily obtained.

(2. Optically Anisotropic Composition: Slow Axis Direction)

In the optically anisotropic multi-layered product according to the present invention, the optically anisotropic layer (Sm) and the optically anisotropic layer (N) have a common slow axis direction. Preferably, the optically anisotropic layer (Sm) and the optically anisotropic layer (N) have a common slow axis direction, and the liquid crystal compound (A) is fixed in a homogeneously oriented state in these layers. When the optically anisotropic multi-layered product according to the present invention has such a configuration, a highly durable layer can be obtained in which the wavelength dispersion change caused by an Re drop and heating is suppressed.

The state of having a "common slow axis direction" refers to a state in which the slow axis direction of the optically anisotropic layer (Sm) and the slow axis direction of the optically anisotropic layer (N) are parallel or form an angle that is almost parallel. Specifically, it refers to a state in which an angle formed between these slow axis directions when observed from a direction perpendicular to the optically anisotropic multi-layered product is preferably within 3°, more preferably within 2°, and still more preferably within 1°. When the slow axis directions are common in this manner, the optically anisotropic multi-layered product can be a highly durable multi-layered product in which a wavelength dispersion change caused by an Re drop and heating is suppressed.

(3. Method for Producing Optically Anisotropic Multi-Layered Product)

The optically anisotropic multi-layered product according to the present invention may be produced by obtaining the optically anisotropic layer (Sm) and the optically anisotropic layer (N) and bonding these layers. The bonding is performed while the slow axis directions of these layers are aligned in parallel or almost in parallel. The bonding may be achieved by bringing these layers into pressure contact with each other directly or through an appropriate adhesive agent. When the optically anisotropic layer (Sm) and the optically anisotropic layer (N) are formed as long-length films which have the same angle formed between the slow axis direction and the lengthwise direction, these layers may be bonded by a roll-to-roll process to achieve efficient bonding. Although the optically anisotropic multi-layered product according to the present invention may include one optically anisotropic layer (Sm) and one optically anisotropic layer (N), it may include, for example, two or more optically anisotropic layers (Sm) and/or two or more optically anisotropic layers (N). In the optically anisotropic multi-layered product, the ratio between the total thickness of the optically anisotropic layer (Sm) and the total thickness of the optically anisotropic layer (N) is preferably 7:3 to 5:5. The optically anisotropic multi-layered product may include, in addition to the optically anisotropic layers, a substrate such as a transparent resin substrate and a glass plate substrate, and an optional layer such as an adhesive layer.

(4. Optional Component of Optically Anisotropic Layer and Method for Producing Optically Anisotropic Layer)

The optically anisotropic layer (Sm) constituting the optically anisotropic multi-layered product according to the present invention may be produced by curing a liquid crystal composition (Sm) containing the liquid crystal compound (A-Sm) in a state in which a smectic liquid crystal phase is exhibited. On the other hand, the optically anisotropic layer (N) may be produced by curing a liquid crystal composition (N) containing the liquid crystal compound (A-N) in a state in which a nematic liquid crystal phase is exhibited. More specifically, an optically anisotropic layer may be produced by forming a coating film of a liquid crystal composition and curing the coating film to obtain a cured product.

The liquid crystal composition may contain, in addition to the liquid crystal compound (A), an optional component. The type and ratio of the optional component may be appropriately selected within a range in which the liquid crystal composition can retain desired properties (the property of exhibiting a smectic liquid crystal phase or a nematic liquid crystal phase in the process of producing the optically anisotropic layer and the property of curing in a state in which such a liquid crystal phase is exhibited). Examples of such an optional component may include a crosslinking agent, a surfactant, an antioxidant, a solvent such as various organic solvents, and a polymerization initiator. A preferable polymerization initiator is a photopolymerization initiator such as a ultraviolet polymerization initiator, from the viewpoint of facilitating a polymerization operation.

The coating film of the liquid crystal composition may be formed by applying a liquid crystal composition onto one surface of a suitable substrate to obtain a multi-layered product including the substrate and the coating film. As the substrate, a generally used substrate may be appropriately selected according to the technical field. The substrate may have an orientation regulating force on the surface. For example, a regulating force to regulate the orientation direction of the liquid crystal compound (A) may be imparted to the surface by stretching treatment, rubbing treatment, and the like.

After a coating film of the liquid crystal composition has been formed, the temperature may adjusted, and thereby the liquid crystal compound in the liquid crystal composition can be oriented to achieve a state in which a desired liquid crystal phase is exhibited. When the liquid crystal composition exhibits a desired liquid crystal phase both during temperature increase and during temperature decrease, the temperature adjustment in the orientation treatment may be either a temperature increase operation or a temperature decrease operation. When the liquid crystal composition exhibits a desired phase transition during only one of temperature increase or temperature decrease, one of the temperature increase operation and the temperature decrease operation during which the liquid crystal composition exhibits the desired liquid crystal phase is selected. For example, when the liquid crystal composition exhibits a desired liquid crystal phase only during temperature decrease, after optional preliminary heating, the liquid crystal composition is decreased in temperature to a temperature at which a desired liquid crystal phase is exhibited.

The curing of the liquid crystal composition may be achieved by progression of the polymerization of the polymerizable compound in the liquid crystal composition. Specifically, the curing may be achieved by adopting as the liquid crystal composition a liquid crystal composition containing a polymerizable liquid crystal compound and, if necessary, a photopolymerization initiator, and irradiating the coating film with energy rays. As the energy rays, those suitable for achieving the curing of the liquid crystal composition may be appropriately selected, and specifically, light such as UV light may be used. As a result of such curing, the polymerization of the coating film can be achieved to form an optically anisotropic layer.

The irradiation with energy rays may be performed on a side of one surface of the multi-layered product including the substrate and the coating film. The irradiation is preferably performed in an inert gas atmosphere such as nitrogen, from the viewpoint of performing polymerization with a high degree of polymerization.

Since the obtained optically anisotropic layer is such that the Re drop behaviors and wavelength dispersion change behaviors occurring during its use differ between the optically anisotropic layer (Sm) and the optically anisotropic layer (N), these negate each other in the optically anisotropic multi-layered product, and thereby the optically anisotropic multi-layered product can have high durability against heat load during use.

(5. Use Application of Optically Anisotropic Multi-Layered Product)

The optically anisotropic multi-layered product according to the present invention may be used as a phase difference film. Specifically, the optically anisotropic multi-layered product may be used as an optical film having a phase difference in display devices such as a liquid crystal display device and an organic electroluminescent display device. For example, the optically anisotropic multi-layered product may be used in combination with a polarizer layer to be as an antireflective film. Since the optically anisotropic multi-layered product according to the present invention has high durability against heat load during use, the life of a device that includes the optically anisotropic multi-layered product can be extended.

(6. Polymerizable Liquid Crystal Compound)

Specific examples of the polymerizable liquid crystal compound that are examples of the liquid crystal compound (A) may include liquid crystal compounds represented by the following formula (I). The liquid crystal compounds represented by the formula (I) are usually capable of exhibiting a reverse wavelength dispersion birefringence. Some of the liquid crystal compounds represented by the formula (I) have properties with which the compounds is capable of exhibiting a smectic liquid crystal phase and a nematic liquid crystal phase, and tend to have a positive ReD(Sm) and a negative ReD(N) and tend to cause increase in the Re(450)/Re (550) value of a cured product (Sm) by heat treatment and to cause decrease in the Re(450)/Re(550) value of a cured product (N) by heat treatment. Therefore, the present invention can be easily implemented by appropriately selecting a compound that has such a property from the liquid crystal compounds represented by the formula (I).

(Chemical formula 4)

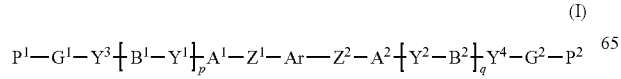

(I)

In the formula (I), Ar represents a divalent organic group of 6 to 67 carbon atoms, which has at least one of an aromatic heterocyclic ring, a heterocyclic ring, and an aromatic hydrocarbon ring and is optionally substituted. Examples of the aromatic heterocyclic ring may include a 1H-isoindole-1,3(2H)-dione ring, a 1-benzofuran ring, a 2-benzofuran ring, an acridine ring, an isoquinoline ring, an imidazole ring, an indole ring, an oxadiazole ring, an oxazole ring, an oxazolopyrazine ring, an oxazolopyridine ring, an oxazolopyridazyl ring, an oxazolopyrimidine ring, a quinazoline ring, a quinoxaline ring, a quinoline ring, a cinnoline ring, a thiadiazole ring, a thiazole ring, a thiazolopyrazine ring, a thiazolopyridine ring, a thiazolopyridazine ring, a thiazolopyrimidine ring, a thiophene ring, a triazine ring, a triazole ring, a naphthyridine ring, a pyrazine ring, a pyrazole ring, a pyranone ring, a pyran ring, a pyridine ring, a pyridazine ring, a pyrimidine ring, a pyrrole ring, a phenanthridine ring, a phthalazine ring, a furan ring, a benzo(c)thiophene ring, a benzoisoxazole ring, a benzoisothiazole ring, a benzimidazole ring, a benzoxadiazole ring, a benzoxazole ring, a benzothiadiazole ring, a benzothiazole ring, a benzothiophene ring, a benzotriazine ring, a benzotriazole ring, a benzopyrazole ring, and a benzopyranone ring. Examples of the heterocyclic ring may include a 1,3-dithiolane ring, a pyrrolidine, and a piperazine. Examples of the aromatic hydrocarbon ring may include a phenyl ring and a naphthalene ring.

Preferable examples of Ar may include groups represented by any of the following formulas (II-1) to (II-4). In the formulas (II-1) to (II-4), the symbol "*" represents a bonding position with $Z^1$ or $Z^2$. In addition, Ar preferably has a benzothiazole ring.

(Chemical formula 5)

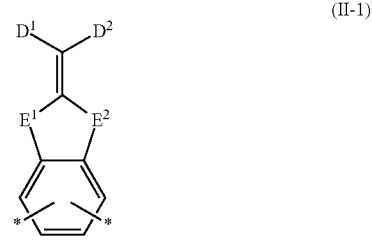

(II-1)

(II-2)

(II-3)

(II-4)

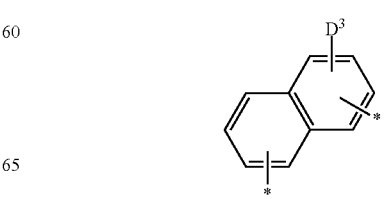

In the aforementioned formulas (II-1) to (II-4), $E^1$ and $E^2$ each independently represent a group selected from the group consisting of —$CR^{11}R^{12}$—, —S—, —$NR^{11}$—, —CO—, and —O—. $R^{11}$ and $R^{12}$ each independently represent a hydrogen atom or an alkyl group of 1 to 4 carbon atoms. Among these, $E^1$ and $E^2$ are preferably each independently —S—.

In the aforementioned formulas (II-1) to (II-4), $D^1$ to $D^2$ each independently represent an acyclic group optionally having a substituent. $D^1$ and $D^2$ may together form a ring. Usually, the numbers of carbon atoms of the respective groups represented by $D^1$ to $D^2$ (including the number of carbon atoms in the substituent) are each independently 1 to 100.

The number of carbon atoms of the acyclic group in $D^1$ to $D^2$ is preferably 1 to 13. Examples of the acyclic group in $D^1$ to $D^2$ may include an alkyl group of 1 to 6 carbon atoms; a cyano group; a carboxyl group; a fluoroalkyl group of 1 to 6 carbon atoms; an alkoxy group of 1 to 6 carbon atoms; —C(═O)—CH$_3$; —C(═O)NHPh; and —C(═O)—OR$^x$. Among these, as the acyclic group, a cyano group, a carboxyl group, —C(═O)—CH$_3$, —C(═O)NHPh, —C(═O)—OC$_2$H$_5$, —C(═O)—OC$_4$H$_9$, —C(═O)—OCH(CH$_3$)$_2$, —C(═O)—OCH$_2$CH$_2$CH(CH$_3$)—OCH$_3$, —C(═O)—OCH$_2$CH$_2$C(CH$_3$)$_2$—OH, and —C(═O)—OCH$_2$CH(CH$_2$CH$_3$)—C$_4$H$_9$ are preferable. The aforementioned symbol "Ph" represents a phenyl group. The aforementioned symbol $R^x$ represents an organic group of 1 to 12 carbon atoms. Specific examples of the $R^x$ may include an alkoxy group of 1 to 12 carbon atoms and an alkyl group of 1 to 12 carbon atoms optionally being substituted with a hydroxyl group.

Examples of the substituent that the acyclic group in $D^1$ to $D^2$ may have may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 1 to 12 carbon atoms such as a dimethylamino group; an alkoxy group of 1 to 6 carbon atoms such as a methoxy group, an ethoxy group, and an isopropoxy group; a nitro group; —OCF$_3$; —C(═O)—R$^b$; —O—C(═O)—R$^b$; —C(═O)O—R$^b$; and —SO$_2$R$^a$. The number of substituents may be one or plural. The plurality of substituents may be the same as or different from one another.

$R^a$ represents a group selected from the group consisting of an alkyl group of 1 to 6 carbon atoms; and an aromatic hydrocarbon ring group of 6 to 20 carbon atoms optionally having as a substituent an alkyl group of 1 to 6 carbon atoms or an alkoxy group of 1 to 6 carbon atoms.

$R^b$ represents a group selected from the group consisting of an alkyl group of 1 to 20 carbon atoms optionally having a substituent; an alkenyl group of 2 to 20 carbon atoms optionally having a substituent; a cycloalkyl group of 3 to 12 carbon atoms optionally having a substituent; and an aromatic hydrocarbon ring group of 6 to 12 carbon atoms optionally having a substituent.

The number of carbon atoms of the alkyl group of 1 to 20 carbon atoms in $R^b$ is preferably 1 to 12, and more preferably 4 to 10. Examples of the alkyl group of 1 to 20 carbon atoms in $R^b$ may include a methyl group, an ethyl group, an n-propyl group, an isopropyl group, an n-butyl group, an isobutyl group, a 1-methylpentyl group, a 1-ethylpentyl group, a sec-butyl group, a t-butyl group, an n-pentyl group, an isopentyl group, a neopentyl group, an n-hexyl group, an isohexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Examples of the substituent that the alkyl group of 1 to 20 carbon atoms in $R^b$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms substituted by an alkoxy group of 1 to 12 carbon atoms such as a methoxymethoxy group and a methoxyethoxy group; a nitro group; an aromatic hydrocarbon ring group of 6 to 20 carbon atoms such as a phenyl group and a naphthyl group; an aromatic heterocyclic ring group of 2 to 20 carbon atoms such as a triazolyl group, a pyrrolyl group, a furanyl group, a thienyl group, a thiazolyl group, and a benzothiazol-2-ylthio group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom such as a trifluoromethyl group, a pentafluoroethyl group, and —CH$_2$CF$_3$; a benzofuryl group; a benzopyranyl group; a benzodioxolyl group; and a benzodioxanyl group. The number of substituents may be one or plural. The plurality of substituents may be the same as or different from one another.

The number of carbon atoms of the alkenyl group of 2 to 20 carbon atoms in $R^b$ is preferably 2 to 12. Examples of the alkenyl group of 2 to 20 carbon atoms in $R^b$ may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadenyl group, and an icocenyl group.

Examples of the substituent that the alkenyl group of 2 to 20 carbon atoms in $R^b$ may have may include the same examples as those of the substituent that the alkyl group of 1 to 20 carbon atoms in $R^b$ may have. The number of substituents may be one or plural. The plurality of substituents may be the same as or different from one another.

Examples of the cycloalkyl group of 3 to 12 carbon atoms in $R^b$ may include a cyclopropyl group, a cyclobutyl group, a cyclopentyl group, a cyclohexyl group, and a cyclooctyl group. Among these, as the cycloalkyl group, a cyclopentyl group and a cyclohexyl group are preferable.

Examples of the substituent that the cycloalkyl group of 3 to 12 carbon atoms in $R^b$ may have may include a halogen atom such as a fluorine atom and a chlorine atom; a cyano group; an N,N-dialkylamino group of 2 to 12 carbon atoms such as a dimethylamino group; an alkyl group of 1 to 6 carbon atoms such as a methyl group, an ethyl group, and a propyl group; an alkoxy group of 1 to 6 carbon atoms such as a methoxy group, an ethoxy group, and an isopropoxy group; a nitro group; and an aromatic hydrocarbon ring group of 6 to 20 carbon atoms such as a phenyl group and a naphthyl group. Among these, as the substituent of the cycloalkyl group, a halogen atom such as a fluorine atom and a chlorine atom; a cyano group; an alkyl group of 1 to 6 carbon atoms such as a methyl group, an ethyl group, and a propyl group; an alkoxy group of 1 to 6 carbon atoms such as a methoxy group, an ethoxy group, and an isopropoxy group; a nitro group; and an aromatic hydrocarbon ring group of 6 to 20 carbon atoms such as a phenyl group and a naphthyl group are preferable. The number of substituents may be one or plural. The plurality of substituents may be the same as or different from one another.

Examples of the aromatic hydrocarbon ring group of 6 to 12 carbon atoms in $R^b$ may include a phenyl group, a 1-naphthyl group, and a 2-naphthyl group. Among these, a phenyl group is preferable as the aromatic hydrocarbon ring group.

Examples of the substituent that the aromatic hydrocarbon ring group of 6 to 12 carbon atoms in $R^b$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms having an alkoxy group of 1 to 12 carbon atoms as a substituent such as a methoxymethoxy group and a methoxyethoxy group; a nitro group; an aromatic heterocyclic ring group of 2 to 20 carbon atoms such as a triazolyl group, a pyrrolyl group, a furanyl group, and a thiophenyl group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom such as a trifluoromethyl group, a pentafluoroethyl group, and —$CH_2CF_3$; —$OCF_3$; a benzofuryl group; a benzopyranyl group; a benzodioxolyl group; and a benzodioxanyl group. Among these, as the substituent of the aromatic hydrocarbon ring group, a halogen atom such as a fluorine atom and a chlorine atom; a cyano group; an alkoxy group of 1 to 20 carbon atoms such as a methoxy group, an ethoxy group, an isopropoxy group, and a butoxy group; a nitro group; an aromatic heterocyclic ring group of 2 to 20 carbon atoms such as a furanyl group and a thiophenyl group; a cycloalkyl group of 3 to 8 carbon atoms such as a cyclopropyl group, a cyclopentyl group, and a cyclohexyl group; a fluoroalkyl group of 1 to 12 carbon atoms in which one or more hydrogen atoms have been substituted with a fluorine atom such as a trifluoromethyl group, a pentafluoroethyl group, and —$CH_2CF_3$; and —$OCF_3$ are preferable. The number of substituents may be one or plural. The plurality of substituents may be the same as or different from one another.

When $D^1$ and $D^2$ together form a ring, an organic group containing the ring is formed by the aforementioned $D^1$ and $D^2$. Examples of the organic group may include groups represented by the following formulas. In the following formulas, the symbol "*" represents a position at which each organic group is bonded to the carbon to which $D^1$ and $D^2$ are bonded.

(Chemical formula 6)

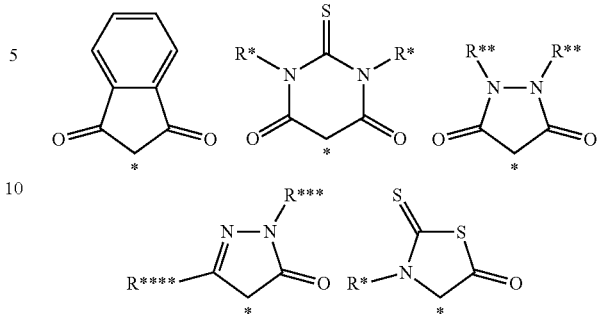

$R^*$ represents an alkyl group of 1 to 3 carbon atoms.

$R^{**}$ represents a group selected from the group consisting of an alkyl group of 1 to 3 carbon atoms and a phenyl group optionally having a substituent.

$R^{***}$ represents a group selected from the group consisting of an alkyl group of 1 to 3 carbon atoms and a phenyl group optionally having a substituent.

$R^{****}$ represents a group selected from the group consisting of a hydrogen atom, an alkyl group of 1 to 3 carbon atoms, a hydroxyl group, and —$COOR^{13}$. $R^{13}$ represents an alkyl group of 1 to 3 carbon atoms.

Examples of the substituent that the phenyl group may have may include a halogen atom, an alkyl group, an alkenyl group, an aryl group, a heterocyclic ring group, a hydroxyl group, a carboxyl group, an alkoxy group, an aryloxy group, an acyloxy group, a cyano group, and an amino group. Among these, as a substituent, a halogen atom, an alkyl group, a cyano group, and an alkoxy group are preferable. The number of substituents that the phenyl group has may be one or plural. The plurality of substituents may be the same as or different from one another.

In the aforementioned formulas (II-1) to (II-4), $D^3$ represents a group selected from the group consisting of —$C(R^f)$=N—N($R^g$) $R^h$, —C(RE)=N—N=C($R^g$)$R^h$, and —C(RE)=N—N=$R^i$. The number of carbon atoms of the group represented by $D^3$ (including the number of carbon atoms in the substituent) is usually 3 to 100.

$R^f$ represents a group selected from the group consisting of a hydrogen atom, and an alkyl group of 1 to 6 carbon atoms such as a methyl group, an ethyl group, a propyl group, and an isopropyl group.

$R^g$ represents a group selected from the group consisting of a hydrogen atom, and an organic group of 1 to 30 carbon atoms optionally having a substituent.

Examples of the organic group of 1 to 30 carbon atoms optionally having a substituent in $R^g$ may include an alkyl group of 1 to 20 carbon atoms optionally having a substituent; a group in which at least one of —$CH_2$— groups contained in the alkyl group of 1 to 20 carbon atoms is substituted with —O—, —S—, —O—C(=O)—, —C(=O)—O—, or —C(=O)— (except for cases where a moiety of two or more contiguous —O—'s or —S—'s forms an intervening group); an alkenyl group of 2 to 20 carbon atoms optionally having a substituent; an alkynyl group of 2 to 20 carbon atoms optionally having a substituent; a cycloalkyl group of 3 to 12 carbon atoms optionally having a substituent; an aromatic hydrocarbon ring group of 6 to 30 carbon atoms optionally having a substituent; an aromatic heterocyclic ring group of 2 to 30 carbon atoms optionally having a substituent; -$G^x$-$Y^x$-$F^x$; —$SO_2R^a$;

—C(=O)—R$^b$; and —CS—NH—R$^b$. The meanings of R$^a$ and R$^b$ are as described above.

Preferable ranges of the number of carbon atoms of the alkyl group of 1 to 20 carbon atoms in R$^g$ and examples thereof are the same as those of the alkyl group of 1 to 20 carbon atoms in R$^b$.

Examples of the substituent that the alkyl group of 1 to 20 carbon atoms in R$^g$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms having an alkoxy group of 1 to 12 carbon atoms as a substituent such as a methoxymethoxy group and a methoxyethoxy group; a nitro group; an aromatic hydrocarbon ring group of 6 to 20 carbon atoms such as a phenyl group and a naphthyl group; an aromatic heterocyclic ring group of 2 to 20 carbon atoms such as a triazolyl group, a pyrrolyl group, a furanyl group, and a thiophenyl group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom; a benzofuryl group; a benzopyranyl group; a benzodioxolyl group; a benzodioxanyl group; —SO$_2$R$^a$; —SR$^b$; an alkoxy group of 1 to 12 carbon atoms substituted with —SR$^b$; and a hydroxyl group. The meanings of R$^a$ and R$^b$ are as described above. The number of substituents may be one or plural. The plurality of substituents may be the same as or different from one another.

Preferable ranges of the number of carbon atoms of the alkenyl group of 2 to 20 carbon atoms in R$^g$ and examples thereof are the same as those of the alkenyl group of 2 to 20 carbon atoms in R$^b$.

Examples of the substituent that the alkenyl group of 2 to 20 carbon atoms in R$^g$ may have may include the same examples as those of the substituent that the alkyl group of 1 to 20 carbon atoms in R$^g$ may have. The number of substituents may be one or plural. The plurality of substituents may be the same as or different from one another.

Examples of the alkynyl group of 2 to 20 carbon atoms in R$^g$ may include an ethynyl group, a propynyl group, a 2-propynyl group (a propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituent that the alkynyl group of 2 to 20 carbon atoms in R$^g$ may have may include the same examples as those of the substituent that the alkyl group of 1 to 20 carbon atoms in R$^g$ may have. The number of substituents may be one or plural. The plurality of substituents may be the same as or different from one another.

Examples of the cycloalkyl group of 3 to 12 carbon atoms in R$^g$ may include the same example as those of the cycloalkyl group of 3 to 12 carbon atoms in R$^b$.

Examples of the substituent that the cycloalkyl group of 3 to 12 carbon atoms in R$^g$ may have may include the same examples as those of the substituent that the alkyl group of 1 to 20 carbon atoms in R$^g$ may have. The number of substituents may be one or plural. The plurality of substituents may be the same as or different from one another.

Examples of the aromatic hydrocarbon ring group of 6 to 30 carbon atoms in R$^g$ may include a phenyl group and a naphthyl group. Among these, a phenyl group is more preferable as the aromatic hydrocarbon ring group.

Examples of the substituent that the aromatic hydrocarbon ring group of 6 to 30 carbon atoms in R$^g$ may have may include the same examples as those of the substituent that the acyclic group in D$^1$ to D$^2$ may have. The number of substituents may be one or plural. The plurality of substituents may be the same as or different from one another.

Examples of the aromatic heterocyclic ring group of 2 to 30 carbon atoms in R$^g$ may include a 1-benzofuranyl group, a 2-benzofuranyl group, an imidazolyl group, an indolinyl group, a furazanyl group, an oxazolyl group, a quinolyl group, a thiadiazolyl group, a thiazolyl group, a thiazolopyrazinyl group, a thiazolopyridyl group, a thiazolopyridazinyl group, a thiazolopyrimidinyl group, a thienyl group, a triazinyl group, a triazolyl group, a naphthyridinyl group, a pyrazinyl group, a pyrazolyl group, a pyranyl group, a pyridyl group, a pyridazinyl group, a pyrimidinyl group, a pyrrolyl group, a phthalazinyl group, a furanyl group, a benzo(c)thienyl group, a benzo(b)thienyl group, a benzoisoxazolyl group, a benzoisothiazolyl group, a benzimidazolyl group, a benzoxadiazolyl group, a benzoxazolyl group, a benzothiadiazolyl group, a benzothiazolyl group, a benzotriazinyl group, a benzotriazolyl group, and a benzopyrazolyl group. Among these, as the aromatic heterocyclic ring group, a monocyclic aromatic heterocyclic ring group such as a furanyl group, a pyranyl group, a thienyl group, an oxazolyl group, a furazanyl group, a thiazolyl group, and a thiadiazolyl group; and an aromatic heterocyclic ring group having a condensed ring such as a benzothiazolyl group, a benzoxazolyl group, a quinolyl group, a 1-benzofuranyl group, a 2-benzofuranyl group, a phthalimide group, a benzo(c)thienyl group, a benzo(b)thienyl group, a thiazolopyridyl group, a thiazolopyrazinyl group, a benzoisoxazolyl group, a benzoxadiazolyl group, and a benzothiadiazolyl group are more preferable.

Examples of the substituent that the aromatic heterocyclic ring group of 2 to 30 carbon atoms in R$^g$ may have may include the same examples as those of the substituent that the acyclic group in D$^1$ to D$^2$ may have. The number of substituents may be one or plural. The plurality of substituents may be the same as or different from one another.

G$^x$ represents an organic group selected from the group consisting of a divalent aliphatic hydrocarbon group of 1 to 30 carbon atoms optionally having a substituent; and a group in which at least one of —CH$_2$— groups contained in a divalent aliphatic hydrocarbon group of 3 to 30 carbon atoms optionally having a substituent is substituted with —O—, —S—, —O—C(=O)—, —C(=O)—O—, —O—C(=O)—O—, —NR$^{14}$—C(=O)—, —C(=O)—NR$^{14}$—, —NR$^{14}$—, or —C(=O)— (except for cases where a moiety of two or more contiguous —O—'s or —S—'s forms an intervening group). R$^{14}$ represents a hydrogen atom or an alkyl group of 1 to 6 carbon atoms. The "divalent aliphatic hydrocarbon group" is preferably a divalent chain aliphatic hydrocarbon group, and more preferably an alkylene group.

Y$^x$ represents a group selected from the group consisting of —O—, —C(=O)—, —S—, —C(=O)—O—, —O—C(=O)—, —O—C(=O)—O—, —C(=O)—S—, —S—C(=O)—, —NR$^{15}$—C(=O)—, —C(=O)—NR$^{15}$—, —O—C(=O)—NR$^{15}$—, —NR$^{15}$—C(=O)—O—, —N=N—, and —C≡C—. $R^{15}$ represents a hydrogen atom or an alkyl group of 1 to 6 carbon atoms. Among these, as $Y^x$, —O—, —O—C(=O)—O—, and —C(=O)—O—, are preferable.

$F^x$ represents an organic group having at least one of an aromatic hydrocarbon ring and an aromatic heterocyclic ring. The number of carbon atoms of the organic group is preferably 2 or more, more preferably 7 or more, still more preferably 8 or more, and particularly preferably 10 or more, and is preferably 30 or less. The number of carbon atoms of the aforementioned organic group does not include the number of the carbon atoms of the substituent.

Examples of the aromatic hydrocarbon ring in $F^x$ may include an aromatic hydrocarbon ring of 6 to 30 carbon atoms such as a benzene ring, a naphthalene ring, an anthracene ring, a phenanthrene ring, a pyrene ring, and a fluorene ring. When $F^x$ has a plurality of aromatic hydrocarbon rings, the plurality of aromatic hydrocarbon rings may be the same as or different from one another.

The aromatic hydrocarbon ring in $F^x$ may have a substituent. Examples of the substituent that the aromatic hydrocarbon ring in $F^x$ may have may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group and a pentafluoroethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; —OCF$_3$; —C(=O)—R$^b$; —C(=O)—O—R$^b$; and —O—C(=O)—R$^b$. The meaning of R$^b$ is as described above. The number of substituents may be one or plural. The plurality of substituents may be the same as or different from one another.

Examples of the aromatic heterocyclic ring in $F^x$ may include an aromatic heterocyclic ring of 2 to 30 carbon atoms such as a 1H-isoindole-1,3(2H)-dione ring, a 1-benzofuran ring, a 2-benzofuran ring, an acridine ring, an isoquinoline ring, an imidazole ring, an indole ring, an oxadiazole ring, an oxazole ring, an oxazolopyrazine ring, an oxazolopyridine ring, an oxazolopyridazyl ring, an oxazolopyrimidine ring, a quinazoline ring, a quinoxaline ring, a quinoline ring, a cinnoline ring, a thiadiazole ring, a thiazole ring, a thiazolopyrazine ring, a thiazolopyridine ring, a thiazolopyridazine ring, a thiazolopyrimidine ring, a thiophene ring, a triazine ring, a triazole ring, a naphthyridine ring, a pyrazine ring, a pyrazole ring, a pyranone ring, a pyran ring, a pyridine ring, a pyridazine ring, a pyrimidine ring, a pyrrole ring, a phenanthridine ring, a phthalazine ring, a furan ring, a benzo(c)thiophene ring, a benzoisoxazole ring, a benzoisothiazole ring, a benzimidazole ring, a benzoxadiazole ring, a benzoxazole ring, a benzothiadiazole ring, a benzothiazole ring, a benzothiophene ring, a benzotriazine ring, a benzotriazole ring, a benzopyrazole ring, and a benzopyranone ring. When $F^x$ has a plurality of aromatic heterocyclic rings, the plurality of aromatic heterocyclic rings may be the same as or different from one another.

The aromatic heterocyclic ring in $F^x$ may have a substituent. Examples of the substituent that the aromatic heterocyclic ring in $F^x$ may have may include the same examples as those of the substituent that the aromatic hydrocarbon ring in $F^x$ may have. The number of substituents may be one or plural. The plurality of substituents may be the same as or different from one another.

Preferable examples of $F^x$ may include a "cyclic group of 2 to 20 carbon atoms, having at least one of an aromatic hydrocarbon ring and an aromatic heterocyclic ring, optionally having a substituent". This cyclic group may hereinafter be referred to as a "cyclic group (a)" as appropriate.

Examples of the substituent that the cyclic group (a) may have may include the same substituents as those of the substituent that the aromatic hydrocarbon ring in $F^x$ may have. The number of substituents may be one or plural. The plurality of substituents may be the same as or different from one another.

Preferable examples of the cyclic group (a) may include a hydrocarbon ring group of 6 to 20 carbon atoms, having at least one aromatic hydrocarbon ring of 6 to 18 carbon atoms, optionally having a substituent. This hydrocarbon ring group may hereinafter be referred to as a "hydrocarbon ring group (a1)" as appropriate.

Examples of the hydrocarbon ring group (a1) may include an aromatic hydrocarbon ring group of 6 to 18 carbon atoms such as a phenyl group (6 carbon atoms), a naphthyl group (10 carbon atoms), an anthracenyl group (14 carbon atoms), a phenanthrenyl group (14 carbon atoms), a pyrenyl group (16 carbon atoms), a fluorenyl group (13 carbon atoms), an indanyl group (9 carbon atoms), a 1,2,3,4-tetrahydronaphthyl group (10 carbon atoms), and a 1,4-dihydronaphthyl group (10 carbon atoms).

Specific examples of the aforementioned hydrocarbon ring group (a1) may include groups represented by the following formulas (1-1) to (1-21). These groups may have a substituent. In the formulas below, the symbol "-" represents a bond with $Y^x$ extending from any optional position in the ring.

(Chemical formula 7)

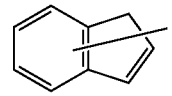

(1-1)

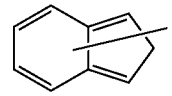

(1-2)

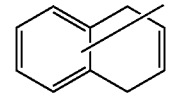

(1-3)

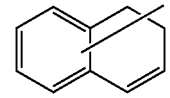

(1-4)

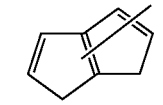

(1-5)

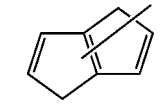

(1-6)

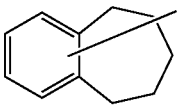

(1-7)

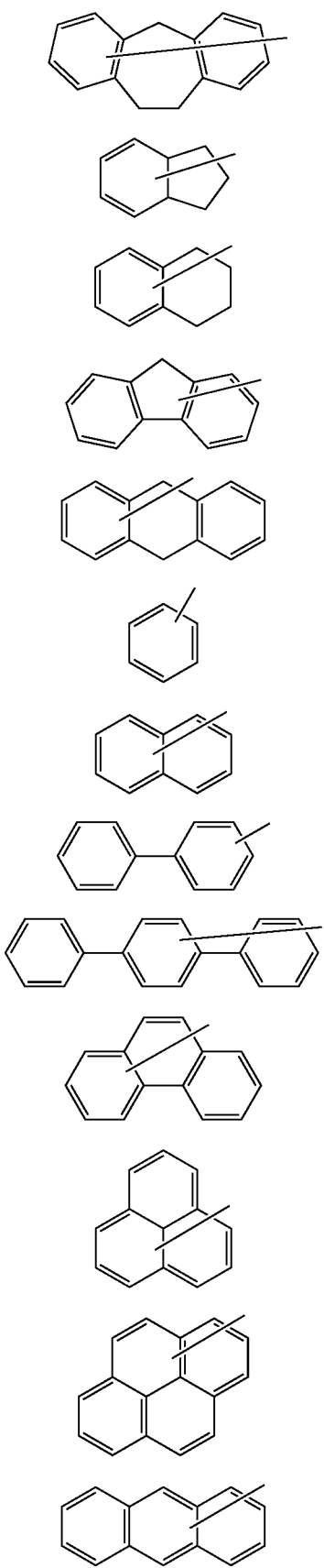

(1-8)
(1-9)
(1-10)
(1-11)
(1-12)
(1-13)
(1-14)
(1-15)
(1-16)
(1-17)
(1-18)
(1-19)
(1-20)

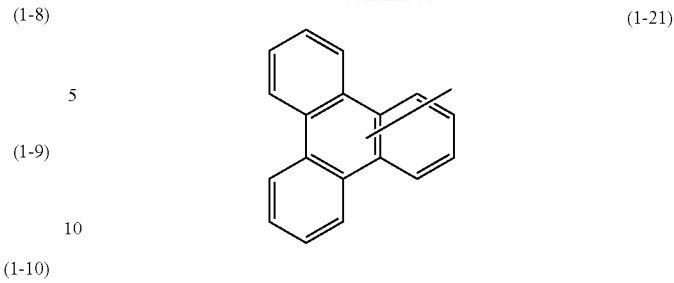

(1-21)

Other preferable examples of the cyclic group (a) may include a heterocyclic ring group of 2 to 20 carbon atoms, having one or more aromatic rings selected from the group consisting of an aromatic hydrocarbon ring of 6 to 18 carbon atoms and an aromatic heterocyclic ring of 2 to 18 carbon atoms, optionally having a substituent. This heterocyclic ring group may hereinafter be referred to as a "heterocyclic ring group (a2)" as appropriate.

Examples of the heterocyclic ring group (a2) may include an aromatic heterocyclic ring group of 2 to 18 carbon atoms such as a phthalimide group, a 1-benzofuranyl group, a 2-benzofuranyl group, an acridinyl group, an isoquinolinyl group, an imidazolyl group, an indolinyl group, a furazanyl group, an oxazolyl group, an oxazolopyrazinyl group, an oxazolopyridinyl group, an oxazolopyridazinyl group, an oxazolopyrimidinyl group, a quinazolinyl group, a quinoxalinyl group, a quinolyl group, a cinnolinyl group, a thiadiazolyl group, a thiazolyl group, a thiazolopyrazinyl group, a thiazolopyridinyl group, a thiazolopyridazinyl group, a thiazolopyrimidinyl group, a thienyl group, a triazinyl group, a triazolyl group, a naphthyridinyl group, a pyrazinyl group, a pyrazolyl group, a pyranonyl group, a pyranyl group, a pyridyl group, a pyridazinyl group, a pyrimidinyl group, a pyrrolyl group, a phenanthridinyl group, a phthalazinyl group, a furanyl group, a benzo(c)thienyl group, a benzoisoxazolyl group, a benzoisothiazolyl group, a benzimidazolyl group, a benzoxazolyl group, a benzothiadiazolyl group, a benzothiazolyl group, a benzothiophenyl group, a benzotriazinyl group, a benzotriazolyl group, a benzopyrazolyl group, and a benzopyranonyl group; a xanthenyl group; a 2,3-dihydroindolyl group; a 9,10-dihydroacridinyl group; a 1,2,3,4-tetrahydroquinolyl group; a dihydropyranyl group; a tetrahydropyranyl group; a dihydrofuranyl group; and a tetrahydrofuranyl group.

Specific examples of the aforementioned heterocyclic ring group (a2) may include groups represented by the following formulas (2-1) to (2-51). These groups may have a substituent. In the formulas below, the symbol "-" represents a bond with $Y^x$ extending from any optional position in the ring. In the formulas below, X represents —$CH_2$—, —$NR^c$—, an oxygen atom, a sulfur atom, —SO—, or —$SO_2$—. Y and Z each independently represent —$NR^c$—, an oxygen atom, a sulfur atom, —SO—, or —$SO_2$—. E represents —$NR^c$—, an oxygen atom, or a sulfur atom. Herein, $R^c$ represents a hydrogen atom; or an alkyl group of 1 to 6 carbon atoms such as a methyl group, an ethyl group, and a propyl group. (However, in each of the formulas, each of the oxygen atom, the sulfur atom, —SO—, and —$SO_2$— is not contiguous with one another.

(Chemical formula 8)
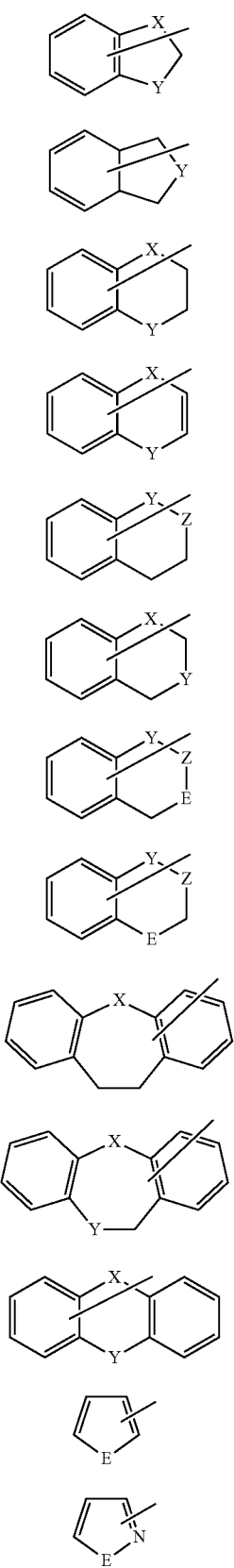
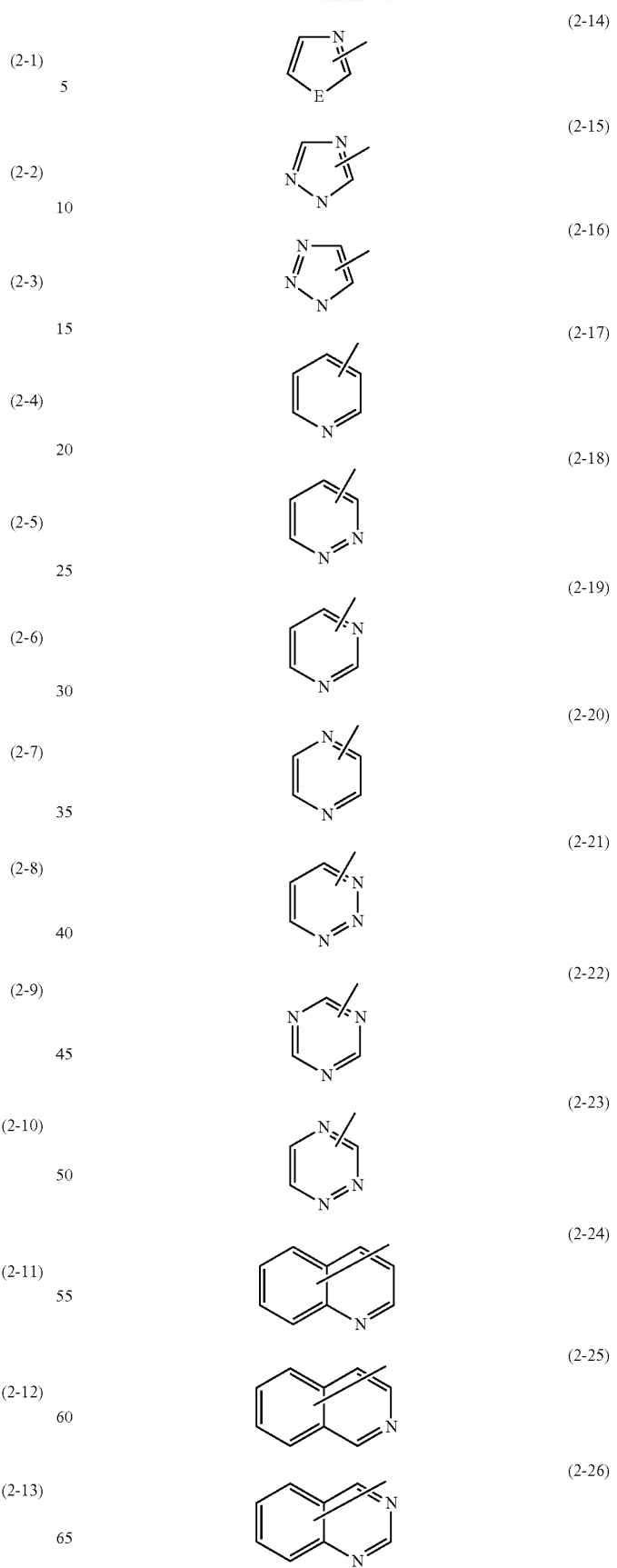

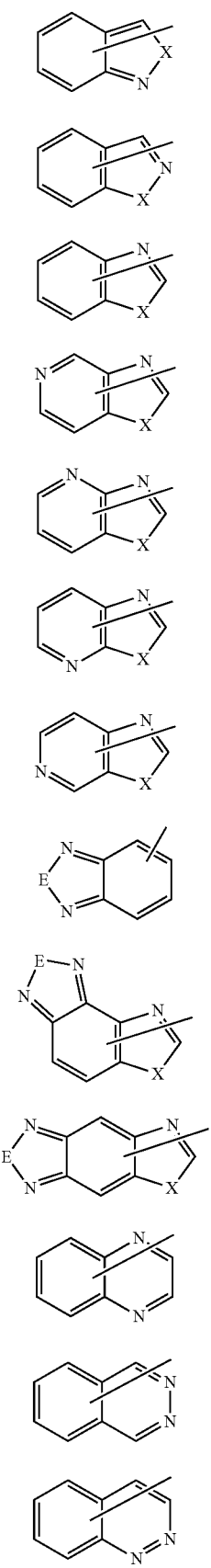
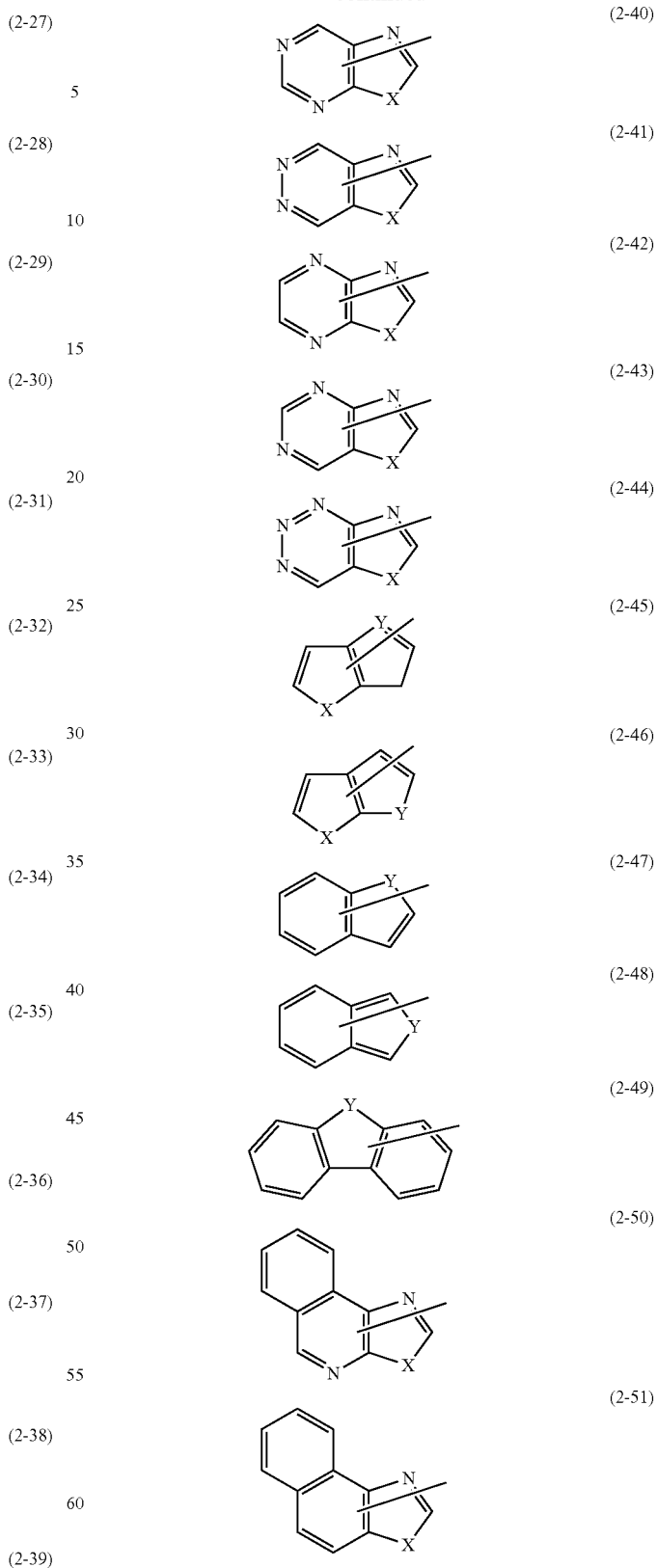
Other preferable examples of $F^x$ may include an "alkyl group of 1 to 18 carbon atoms in which at least one hydrogen atom is substituted with a cyclic group of 2 to 20 carbon atoms, having at least one of an aromatic hydrocarbon ring and an aromatic heterocyclic ring, optionally having a substituent, and which optionally has a substituent other than the cyclic group". This substituted alkyl group may hereinafter be referred to as a "substituted alkyl group (b)" as appropriate.

Examples of the alkyl group of 1 to 18 carbon atoms in the substituted alkyl group (b) may include a methyl group, an ethyl group, a propyl group, and an isopropyl group.

Examples of the "cyclic group of 2 to 20 carbon atoms, having at least one of an aromatic hydrocarbon ring and an aromatic heterocyclic ring, optionally having a substituent" in the substituted alkyl group (b) may include the groups in the range described as the cyclic group (a).

In the substituted alkyl group (b), "at least one of an aromatic hydrocarbon ring and an aromatic heterocyclic ring" may be directly bonded to a carbon atom of the alkyl group of 1 to 18 carbon atoms or may be bonded thereto via a linking group. Examples of the linking group may include —S—, —O—, —C(=O)—, —C(=O)—O—, —O—C(=O)—, —O—C(=O)—O—, —C(=O)—S—, —S—C(=O)—, —NR$^{15}$—C(=O)—, and —C(=O)—NR$^{15}$. The meaning of R$^{15}$ is as described above. Thus, examples of the "cyclic group of 2 to 20 carbon atoms, having at least one of an aromatic hydrocarbon ring and an aromatic heterocyclic ring, optionally having a substituent" in the substituted alkyl group (b) may include a group having at least one of an aromatic hydrocarbon ring and an aromatic heterocyclic ring such as a fluorenyl group and a benzothiazolyl group; an optionally substituted aromatic hydrocarbon ring group; an optionally substituted aromatic heterocyclic ring group; a group composed of an optionally substituted aromatic hydrocarbon ring having a linking group; and a group composed of an optionally substituted aromatic heterocyclic ring having a linking group.

Preferable examples of the aromatic hydrocarbon ring group in the substituted alkyl group (b) may include an aromatic hydrocarbon ring group of 6 to 20 carbon atoms such as a phenyl group, a naphthyl group, an anthracenyl group, a phenanthrenyl group, a pyrenyl group, and a fluorenyl group.

The aromatic hydrocarbon ring group in the substituted alkyl group (b) may have a substituent. Examples of the substituent may include the same examples as those of the substituent that the aromatic hydrocarbon ring in F$^x$ may have. The number of substituents may be one or plural. The plurality of substituents may be the same as or different from one another.

Preferable examples of the aromatic heterocyclic ring group in the substituted alkyl group (b) may include an aromatic heterocyclic ring group of 2 to 20 carbon atoms such as a phthalimide group, a 1-benzofuranyl group, a 2-benzofuranyl group, an acridinyl group, an isoquinolinyl group, an imidazolyl group, an indolinyl group, a furazanyl group, an oxazolyl group, an oxazolopyrazinyl group, an oxazolopyridinyl group, an oxazolopyridazinyl group, an oxazolopyrimidinyl group, a quinazolinyl group, a quinoxalinyl group, a quinolyl group, a cinnolinyl group, a thiadiazolyl group, a thiazolyl group, a thiazolopyrazinyl group, a thiazolopyridyl group, a thiazolopyridazinyl group, a thiazolopyrimidinyl group, a thienyl group, a triazinyl group, a triazolyl group, a naphthyridinyl group, a pyrazinyl group, a pyrazolyl group, a pyranonyl group, a pyranyl group, a pyridyl group, a pyridazinyl group, a pyrimidinyl group, a pyrrolyl group, a phenanthridinyl group, a phthalazinyl group, a furanyl group, a benzo(c)thienyl group, a benzoisoxazolyl group, a benzoisothiazolyl group, a benzimidazolyl group, a benzoxadiazolyl group, a benzoxazolyl group, a benzothiadiazolyl group, a benzothiazolyl group, a benzothienyl group, a benzotriazinyl group, a benzotriazolyl group, a benzopyrazolyl group, and a benzopyranonyl group.

The aromatic heterocyclic ring group in the substituted alkyl group (b) may have a substituent. Examples of the substituent may include the same examples as those of the substituent that the aromatic hydrocarbon ring in F$^x$ may have. The number of substituents may be one or plural. The plurality of substituents may be the same as or different from one another.

Examples of the "group composed of an aromatic hydrocarbon ring having a linking group" and the "group composed of an aromatic heterocyclic ring having a linking group" in the substituted alkyl group (b) may include a phenylthio group, a naphthylthio group, an anthracenylthio group, a phenanthrenylthio group, a pyrenylthio group, a fluorenylthio group, a phenyloxy group, a naphthyloxy group, an anthracenyloxy group, a phenanthrenyloxy group, a pyrenyloxy group, a fluorenyloxy group, a benzoisoxazolylthio group, a benzoisothiazolylthio group, a benzoxadiazolylthio group, a benzoxazolylthio group, a benzothiadiazolylthio group, a benzothiazolylthio group, a benzothienylthio group, a benzoisoxazolyloxy group, a benzoisothiazolyloxy group, a benzoxadiazolyloxy group, a benzoxazolyloxy group, a benzothiadiazolyloxy group, a benzothiazolyloxy group, a benzothienyloxy group.

The "group composed of an aromatic hydrocarbon ring having a linking group" and the "group composed of an aromatic heterocyclic ring having a linking group" in the substituted alkyl group (b) may each have a substituent. Examples of the substituent may include the same examples as those of the substituent that the aromatic hydrocarbon ring in F$^x$ may have. The number of substituents may be one or plural. The plurality of substituents may be the same as or different from one another.

Examples of the substituent other than the cyclic group that the substituted alkyl group (b) may have may include the same examples as those of the substituent that the aromatic hydrocarbon ring in F$^x$ may have. The number of substituents may be one or plural. The plurality of substituents may be the same as or different from one another.

Specific examples of the substituted alkyl group (b) may include groups represented by the following formulas (3-1) to (3-11). These groups may have a substituent. In the formulas below, the symbol "-" represents a bond with Y$^x$ extending from any optional position in the ring. In the following formulas, the symbol "*" represents a bonding position.

(Chemical formula 9)

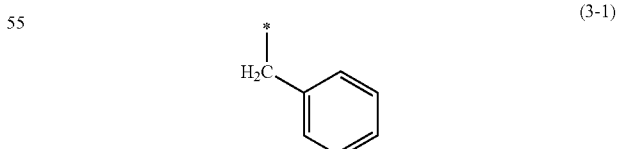

(3-1)

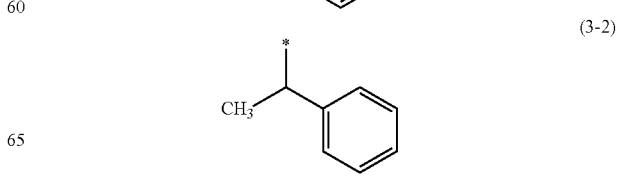

(3-2)

-continued (3-3) [structure]

(3-4) [structure]

(3-5) [structure]

(3-6) [structure]

(3-7) [structure]

(3-8) [structure]

(3-9) [structure]

(3-10) [structure]

(3-11) [structure]

In particular, when Ar is represented by the formula (II-2), F$^x$ is preferably a group represented by any of the following formulas (i-1) to (i-9). In particular, when Ar is represented by the formula (II-3) or formula (II-4), F$^x$ is preferably a group represented by any of the following formulas (i-1) to (i-13). The groups represented by the following formulas (i-1) to (i-13) may have a substituent. In the following formula, the symbol represents a bonding position.

(Chemical formula 10)

(i-1) [structure]

(i-2) [structure]

(i-3) [structure]

(i-4) [structure]

(i-5) [structure]

(i-6) [structure]

(i-7) [structure]

(i-8) [structure]

(i-9) [structure]

(i-10) [structure]

(i-11) [structure]

-continued

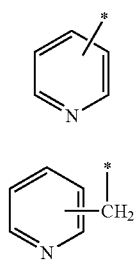 (i-12)

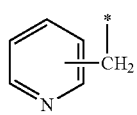 (i-13)

Further, when Ar is represented by the formula (II-2), $F^x$ is particularly preferably a group represented by any of the following formulas (ii-1) to (ii-18). When Ar is represented by the formula (II-3) or formula (II-4), $F^x$ is particularly preferably a group represented by any of the following formulas (ii-1) to (ii-24). The groups represented by the following formulas (ii-1) to (ii-24) may have a substituent. In the following formulas, the meaning of Y is as described above. In the following formulas, the symbol "*" represents a bonding position.

(Chemical formula 11)

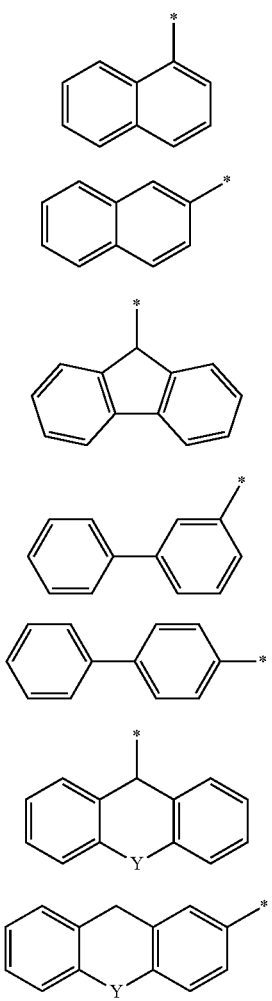

(ii-1)
(ii-2)
(ii-3)
(ii-4)
(ii-5)
(ii-6)
(ii-7)

-continued

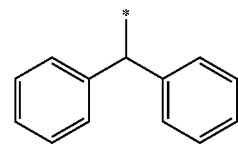 (ii-8)

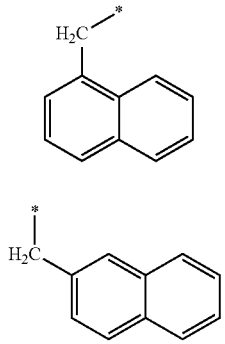 (ii-9)

(ii-10)

(ii-11)

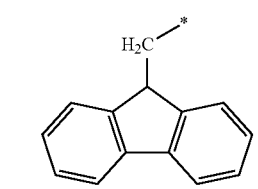 (ii-12)

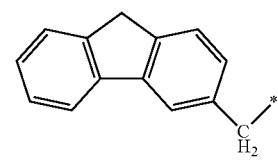 (ii-13)

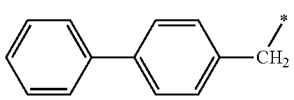 (ii-14)

(Chemical formula 12)

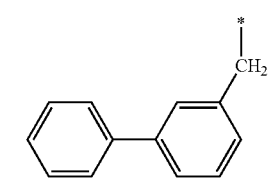 (ii-15)

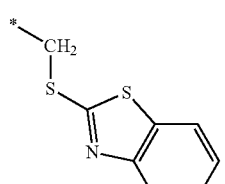 (ii-16)

(ii-17) 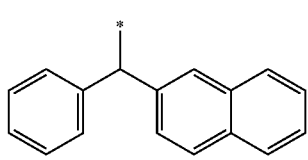

(ii-18) 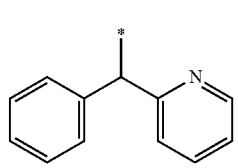

(ii-19) 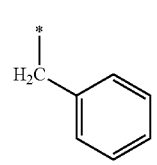

(ii-20) 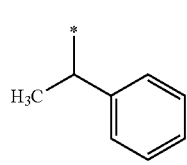

(ii-21) 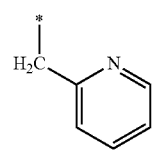

(ii-22) 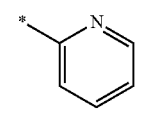

(ii-23) 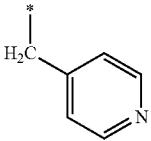

(ii-24) 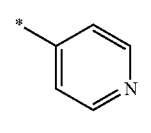

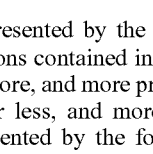

When Ar is represented by the formula (II-2), the total number of π electrons contained in the ring structures in $F^x$ is preferably 8 or more, and more preferably 10 or more, and is preferably 20 or less, and more preferably 18 or less. When Ar is represented by the formula (II-3) or formula (II-4), the total number of n electrons contained in the ring structures in $F^x$ is preferably 4 or more, and more preferably 6 or more, and is preferably 20 or less, and more preferably 18 or less.

Among the groups described above, as $R^q$, an alkyl group of 1 to 20 carbon atoms optionally having a substituent; a group in which at least one of —CH$_2$— groups contained in the alkyl group of 1 to 20 carbon atoms is substituted with —O—, —S—, —O—C(=O)—, —C(=O)—O—, or —C(=O)— (except for cases where a moiety of two or more contiguous —O—'s or —S—'s forms an intervening group); a cycloalkyl group of 3 to 12 carbon atoms optionally having a substituent; an aromatic hydrocarbon ring group of 6 to 30 carbon atoms optionally having a substituent; an aromatic heterocyclic ring group of 2 to 30 carbon atoms optionally having a substituent; and -$G^x$-$Y^x$-$F^x$ are preferable. Among these, as $R^g$, an alkyl group of 1 to 20 carbon atoms optionally having a substituent; a group in which at least one of —CH$_2$— groups contained in the alkyl group of 1 to 20 carbon atoms is substituted with —O—, —S—, —O—C(=O)—, —C(=O)—O—, or —C(=O)— (except for cases where a moiety of two or more contiguous —O—'s or —S—'s forms an intervening group); an aromatic hydrocarbon ring group of 6 to 30 carbon atoms optionally having a substituent; and -$G^x$-$Y^x$-$F^x$ are particularly preferable.

$R^h$ represents an organic group having one or more aromatic rings, selected from the group consisting of an aromatic hydrocarbon ring of 6 to 30 carbon atoms and an aromatic heterocyclic ring of 2 to 30 carbon atoms.

Preferable examples of $R^h$ may include a (1) hydrocarbon ring group of 6 to 40 carbon atoms having one or more aromatic hydrocarbon rings of 6 to 30 carbon atoms. The hydrocarbon ring group having an aromatic hydrocarbon ring may hereinafter be referred to as "(1) hydrocarbon ring group" as appropriate. Specific examples of the (1) hydrocarbon ring group may include the following groups.

(Chemical formula 13)

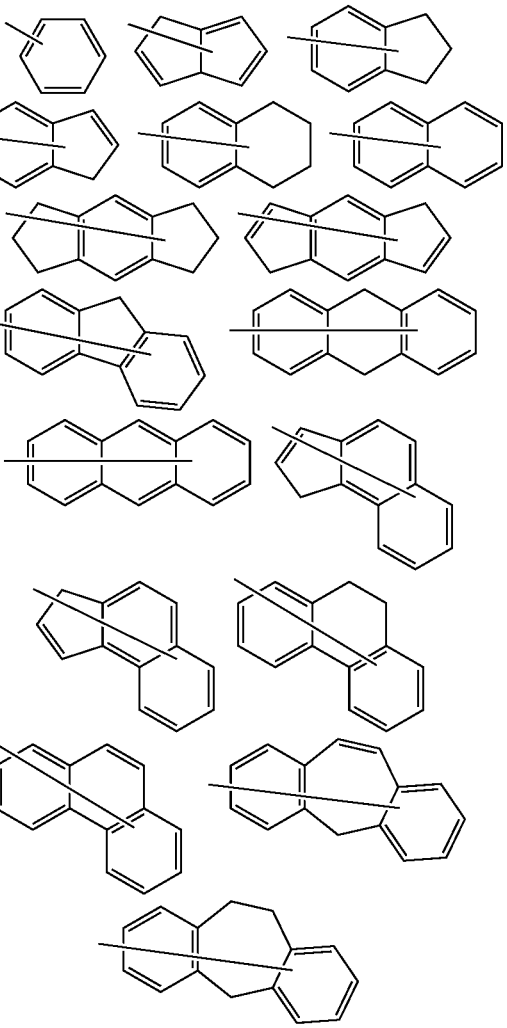

The (1) hydrocarbon ring group may have a substituent. Examples of the substituent that the (1) hydrocarbon ring group may have may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; an aromatic hydrocarbon ring group of 6 to 20 carbon atoms such as a phenyl group and a naphthyl group; —OCF$_3$; —C(=O)—R$^b$; —O—C(=O)—R$^b$; —C(=O)—O—R$^b$; and —SO$_2$R$^a$. The meanings of R$^a$ and R$^b$ are as described above. Among these, a halogen atom, a cyano group, an alkyl group of 1 to 6 carbon atoms, and an alkoxy group of 1 to 6 carbon atoms are preferable. The number of substituents may be one or plural. The plurality of substituents may be the same as or different from one another.

Other preferable examples of R$^h$ may include a (2) heterocyclic ring group of 2 to 40 carbon atoms having one or more aromatic rings selected from the group consisting of an aromatic hydrocarbon ring of 6 to 30 carbon atoms and an aromatic heterocyclic ring of 2 to 30 carbon atoms. This heterocyclic ring group having an aromatic ring is hereinafter referred to as "(2) heterocyclic ring group" as appropriate. Specific examples of the (2) heterocyclic ring group may include the following groups. Each R independently represents a hydrogen atom or an alkyl group having 1 to 6 carbon atoms.

(Chemical formula 14)

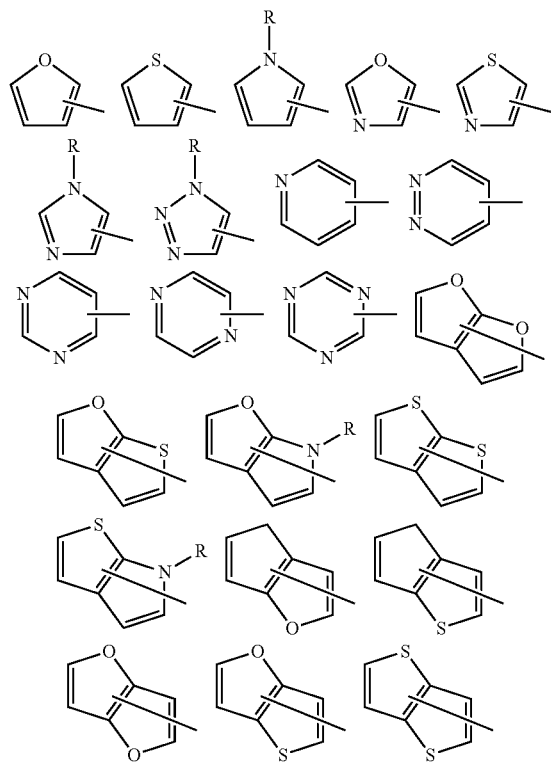

(Chemical formula 15)

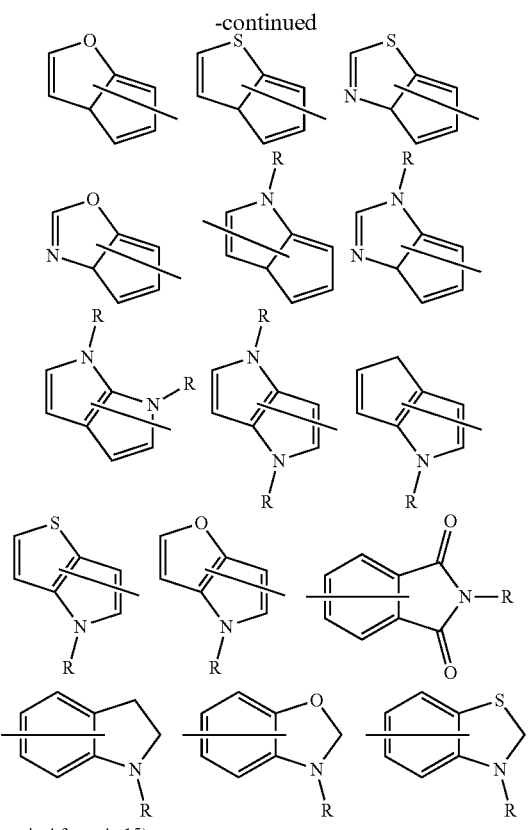

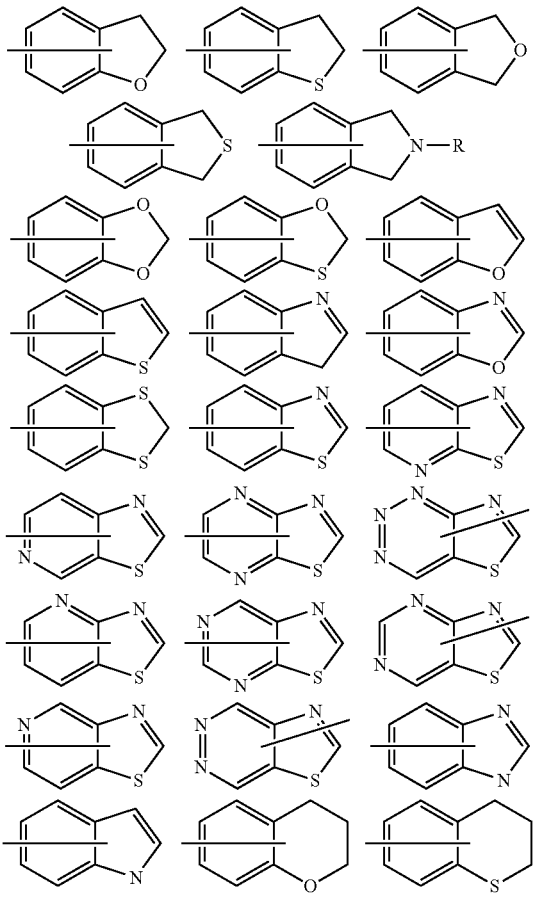

(Chemical formula 16)
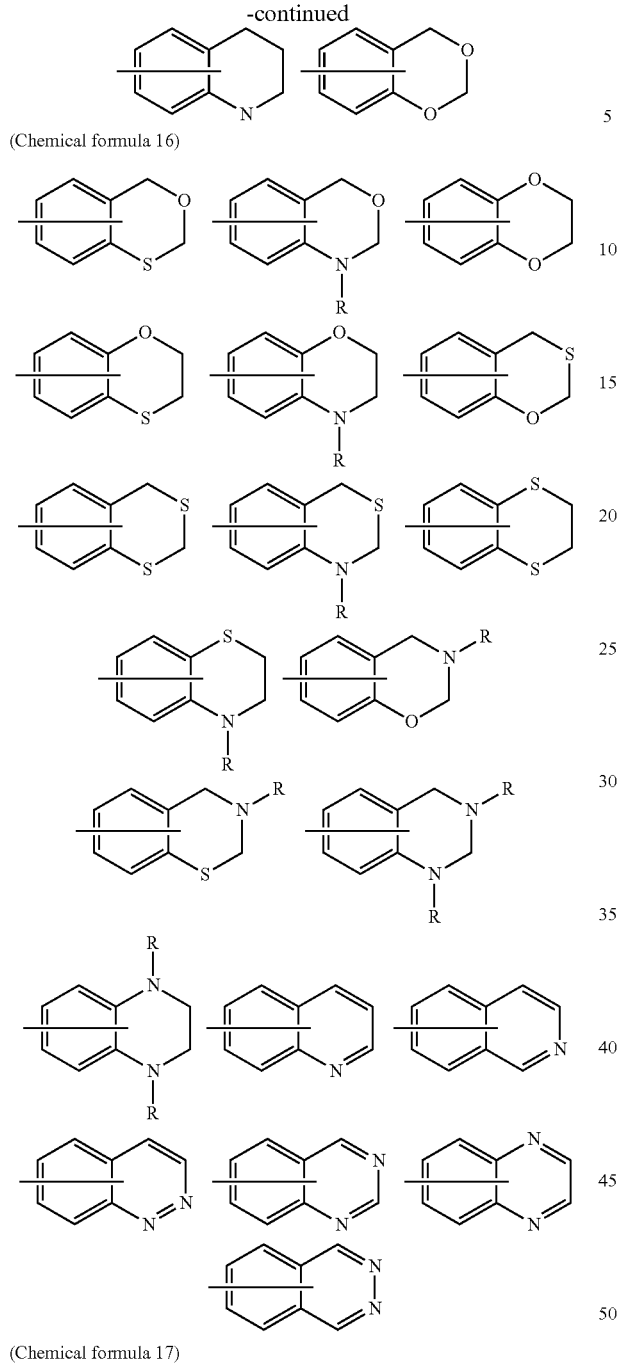
(Chemical formula 17)
(Chemical formula 18)
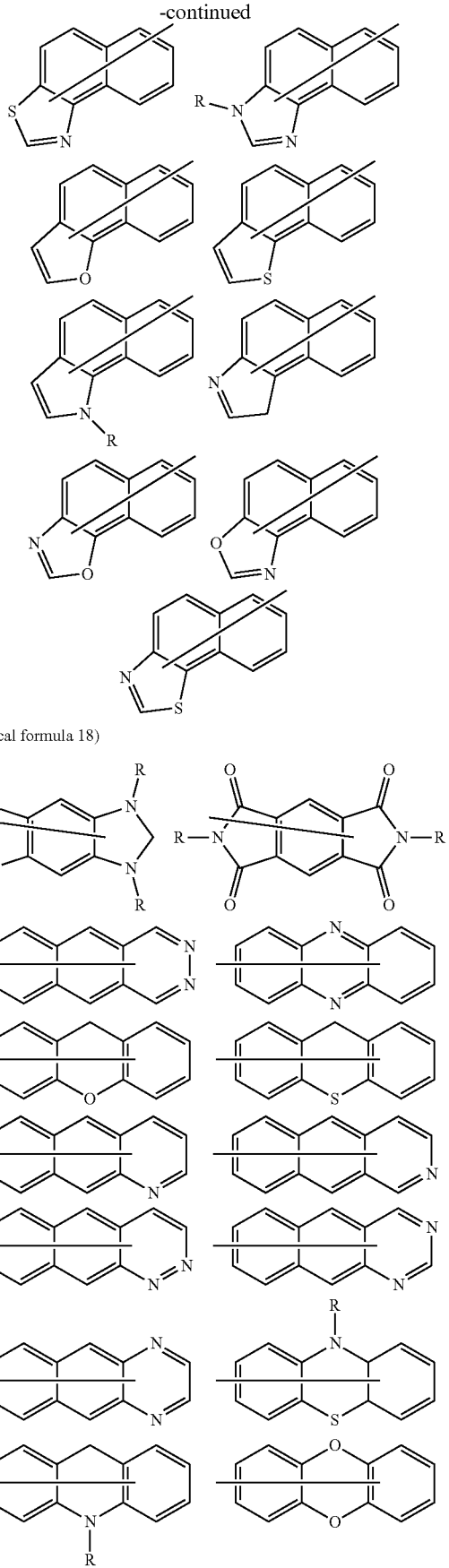

-continued
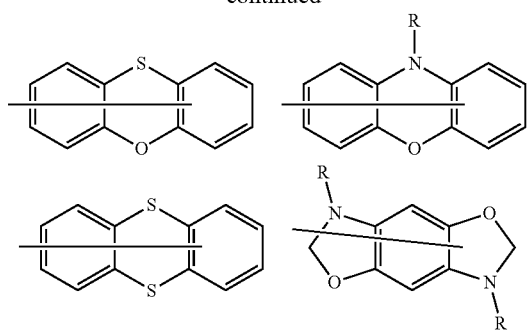
(Chemical formula 19)
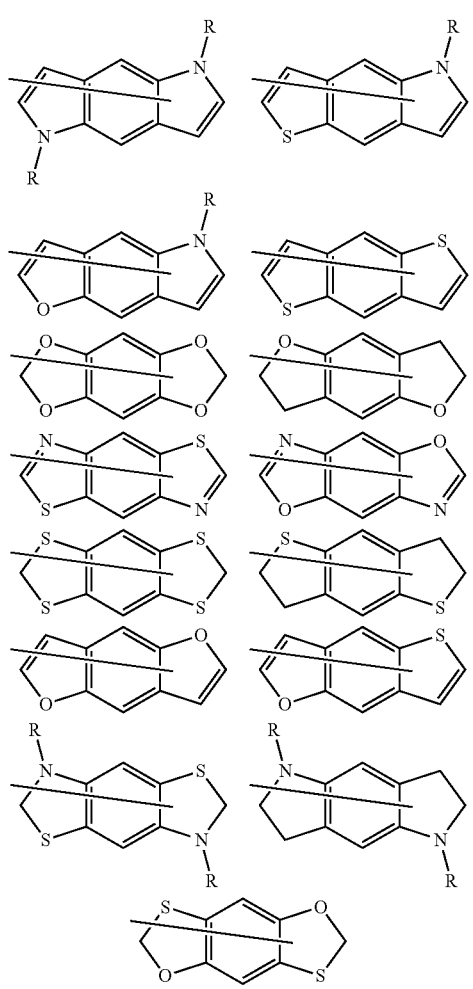
(Chemical formula 20)
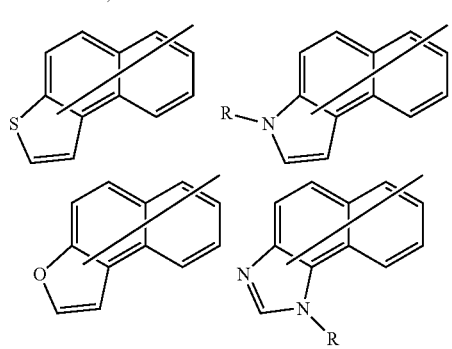
-continued
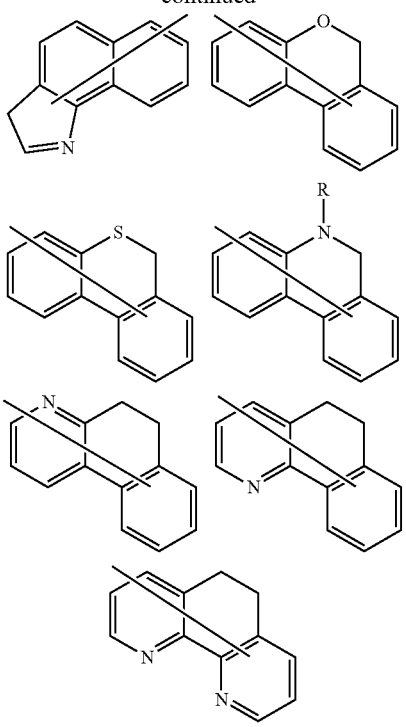
(Chemical formula 21)
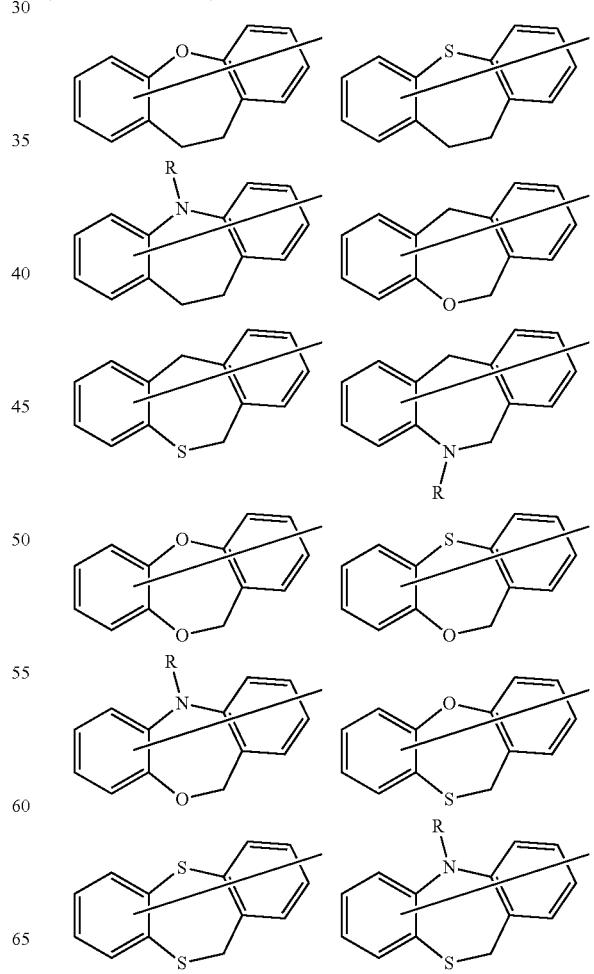

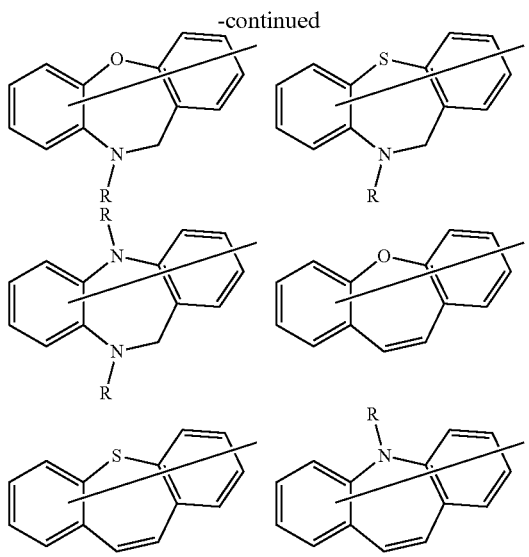

The (2) heterocyclic ring group may have a substituent. Examples of the substituent that the (2) heterocyclic ring group may have may include the same examples as those of the substituent that the (1) hydrocarbon ring group may have. The number of substituents may be one or plural. The plurality of substituents may be the same as or different from one another.

Still other preferable examples of $R^h$ may include an (3) alkyl group of 1 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkyl group may hereinafter be referred to as "(3) substituted alkyl group" as appropriate.

Examples of the "alkyl group of 1 to 12 carbon atoms" in the (3) substituted alkyl group may include a methyl group, an ethyl group, a propyl group, and an isopropyl group.

Examples of the "aromatic hydrocarbon ring group of 6 to 30 carbon atoms" in the (3) substituted alkyl group may include the same examples as those of the aromatic hydrocarbon ring group of 6 to 30 carbon atoms in $R^g$.

Examples of the "aromatic heterocyclic ring group of 2 to 30 carbon atoms" in the (3) substituted alkyl group may include the same examples as those of the aromatic heterocyclic ring group of 2 to 30 carbon atoms in $R^g$.

The (3) substituted alkyl group may further have a substituent. Examples of the substituent that the (3) substituted alkyl group may have may include the same examples as those of the substituent that the (1) hydrocarbon ring group may have. The number of substituents may be one or plural. The plurality of substituents may be the same as or different from one another.

Still other preferable examples of $R^h$ may include an (4) alkenyl group of 2 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkenyl group may hereinafter be referred to as "(4) substituted alkenyl group" as appropriate.

Examples of the "alkenyl group of 2 to 12 carbon atoms" in the (4) substituted alkenyl group may include a vinyl group and an allyl group.

Examples of the "aromatic hydrocarbon ring group of 6 to 30 carbon atoms" in the (4) substituted alkenyl group may include the same examples as those of the aromatic hydrocarbon ring group of 6 to 30 carbon atoms in $R^g$.

Examples of the "aromatic heterocyclic ring group of 2 to 30 carbon atoms" in the (4) substituted alkenyl group may include the same examples as those of the aromatic heterocyclic ring group of 2 to 30 carbon atoms in $R^g$.

The (4) substituted alkenyl group may further have a substituent. Examples of the substituent that the (4) substituted alkenyl group may have may include the same examples as those of the substituent that the (1) hydrocarbon ring group may have. The number of substituents may be one or plural. The plurality of substituents may be the same as or different from one another.

Still other preferable examples of $R^h$ may include an (5) alkynyl group of 2 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkynyl group may hereinafter be referred to as "(5) substituted alkynyl group" as appropriate.

Examples of the "alkynyl group of 2 to 12 carbon atoms" in the (5) substituted alkynyl group may include an ethynyl group and a propynyl group.

Examples of the "aromatic hydrocarbon ring group; of 6 to 30 carbon atoms" in the (5) substituted alkynyl group may include the same examples as those of the aromatic hydrocarbon ring group of 6 to 30 carbon atoms in $R^g$.

Examples of the "aromatic heterocyclic ring group of 2 to 30 carbon atoms" in the (5) substituted alkynyl group may include the same examples as those of the aromatic heterocyclic ring group of 2 to 30 carbon atoms in $R^g$.

The (5) substituted alkynyl group may further have a substituent. Examples of the substituent that the (5) substituted alkynyl group may have may include the same examples as those of the substituent that the (1) hydrocarbon ring group may have. The number of substituents may be one or plural. The plurality of substituents may be the same as or different from one another.

Preferable specific examples of $R^h$ may include the following groups.

(Chemical formula 22)

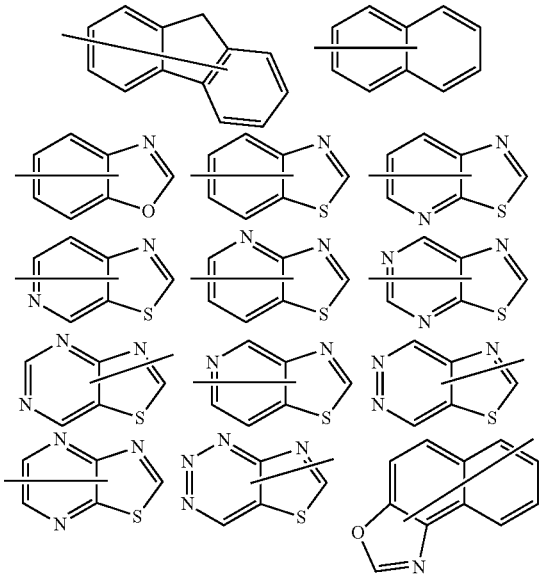

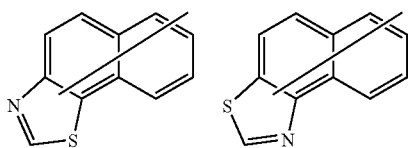

Further preferable specific examples of $R^h$ may include the following groups.

(Chemical formula 23)

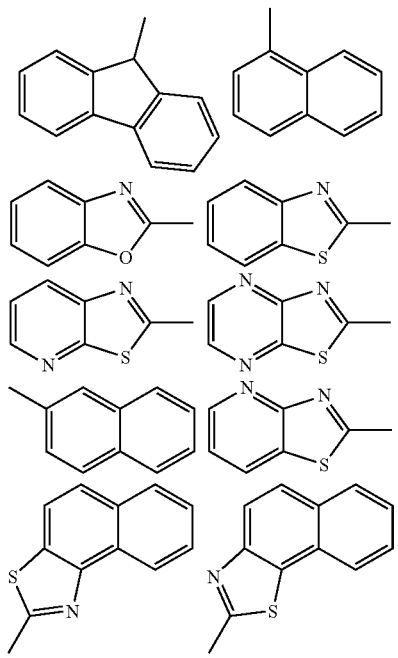

Particularly preferable specific examples of $R^h$ may include the following groups.

(Chemical formula 24)

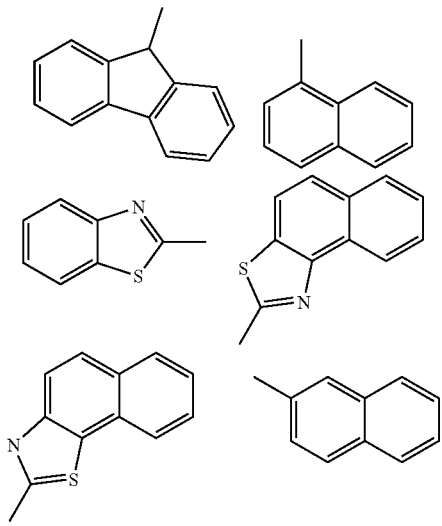

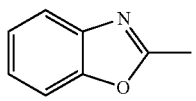

Specific examples of the above-mentioned $R^h$ may further have a substituent. Examples of the substituent may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; —$OCF_3$; —C(=O)—$R^b$; —O—C(=O)—$R^b$; —C(=O)—O—$R^b$; and —$SO_2R^a$. The meanings of $R^a$ and $R^b$ are as described above. Among these, a halogen atom, a cyano group, an alkyl group of 1 to 6 carbon atoms, and an alkoxy group of 1 to 6 carbon atoms are preferable. The number of substituents may be one or plural. The plurality of substituents may be the same as or different from one another.

$R^i$ represents an organic group having one or more aromatic rings selected from the group consisting of an aromatic hydrocarbon ring of 6 to 30 carbon atoms and an aromatic heterocyclic ring of 2 to 30 carbon atoms.

Preferable examples of $R^i$ may include a hydrocarbon ring group of 6 to 40 carbon atoms having one or more aromatic hydrocarbon rings of 6 to 30 carbon atoms.

Other preferable examples of $R^i$ may include a heterocyclic ring group of 2 to 40 carbon atoms having one or more aromatic rings selected from the group consisting of an aromatic hydrocarbon ring of 6 to 30 carbon atoms and an aromatic heterocyclic ring of 2 to 30 carbon atoms.

Particularly preferable specific examples of $R^i$ may include the following groups. The meaning of R is as described above.

(Chemical formula 25)

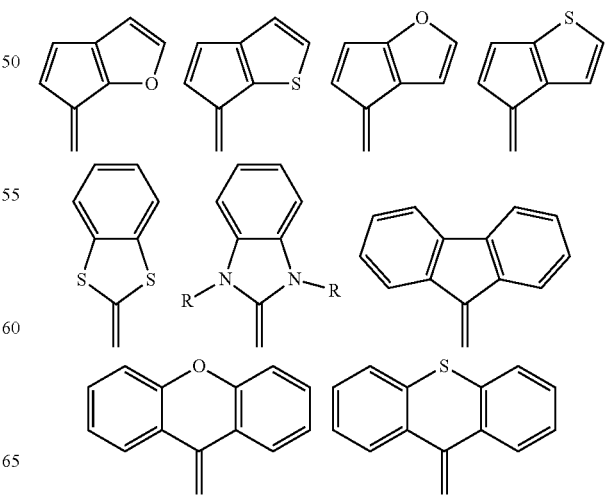

-continued

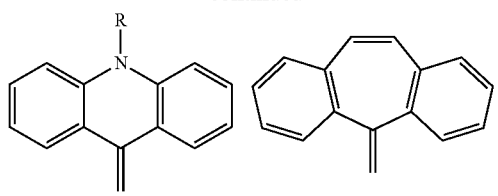

The group represented by any of the formulas (II-1) to (II-4) may further have a substituent other than $D^1$ to $D^3$. Examples of the substituent may include a halogen atom, a cyano group, a nitro group, an alkyl group of 1 to 6 carbon atoms, an alkyl halide group of 1 to 6 carbon atoms, an N-alkylamino group of 1 to 6 carbon atoms, an N,N-dialkylamino group of 2 to 12 carbon atoms, an alkoxy group of 1 to 6 carbon atoms, an alkyl sulfinyl group of 1 to 6 carbon atoms, a carboxyl group, a thioalkyl group of 1 to 6 carbon atoms, an N-alkyl sulfamoyl group of 1 to 6 carbon atoms, and an N,N-dialkyl sulfamoyl group of 2 to 12 carbon atoms. The number of substituents may be one or plural. The plurality of substituents may be the same as or different from one another.

Preferable examples of Ar in the formula (I) may include groups represented by the following formulas (III-1) to (III-7). The groups represented by the formulas (III-1) to (III-7) may have an alkyl group of 1 to 6 carbon atoms as a substituent. In the following formula, the symbol "*" represents a bonding position. Among these, Ar is preferably a group represented by the formula (III-2).

(Chemical formula 26)

(III-1)

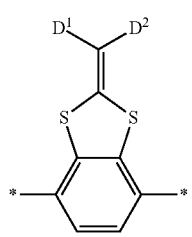

(III-2)

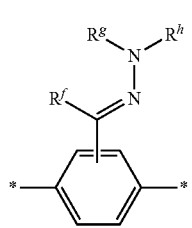

(III-3)

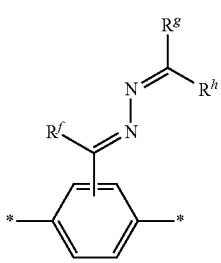

(III-4)

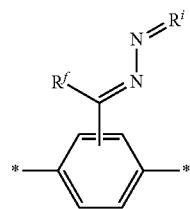

(III-5)

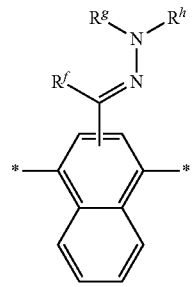

(III-6)

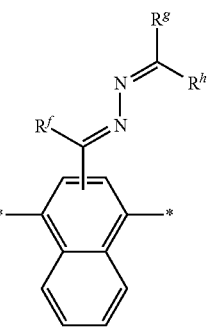

(III-7)

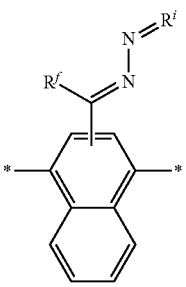

Particularly preferable specific examples of the formula (III-1) may include the following groups. In the following formula, the symbol "*" represents a bonding position.

(Chemical formula 27)

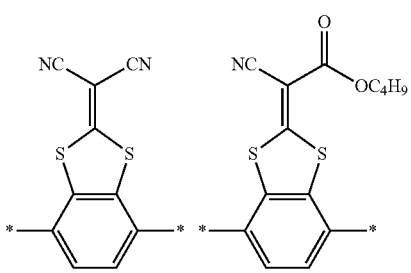

-continued

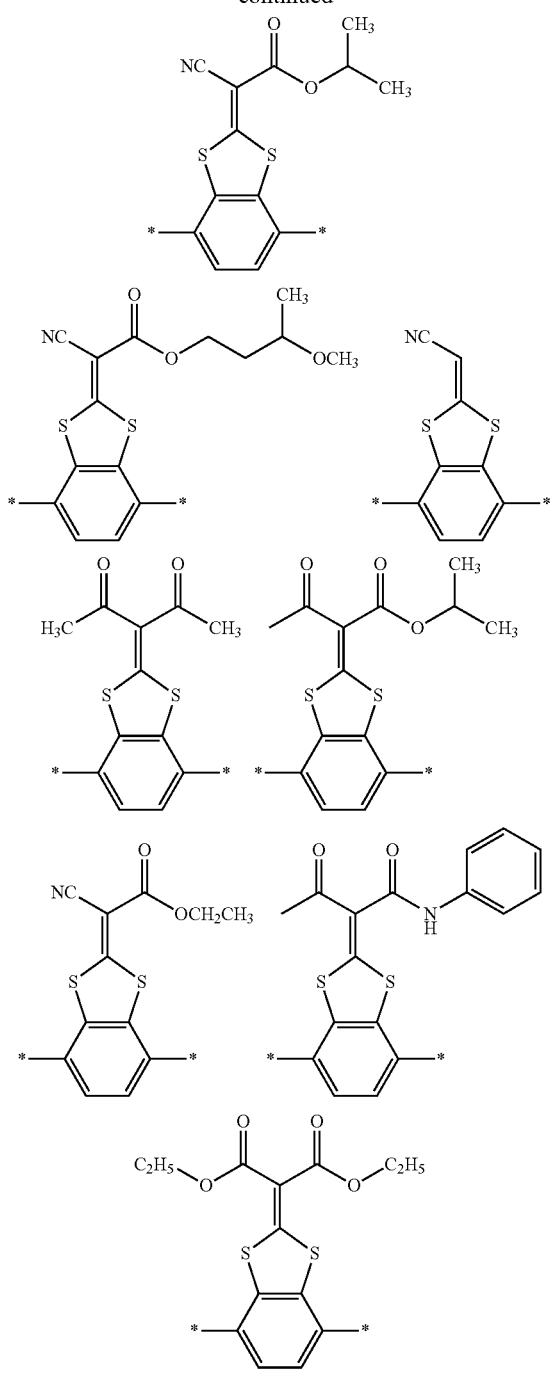

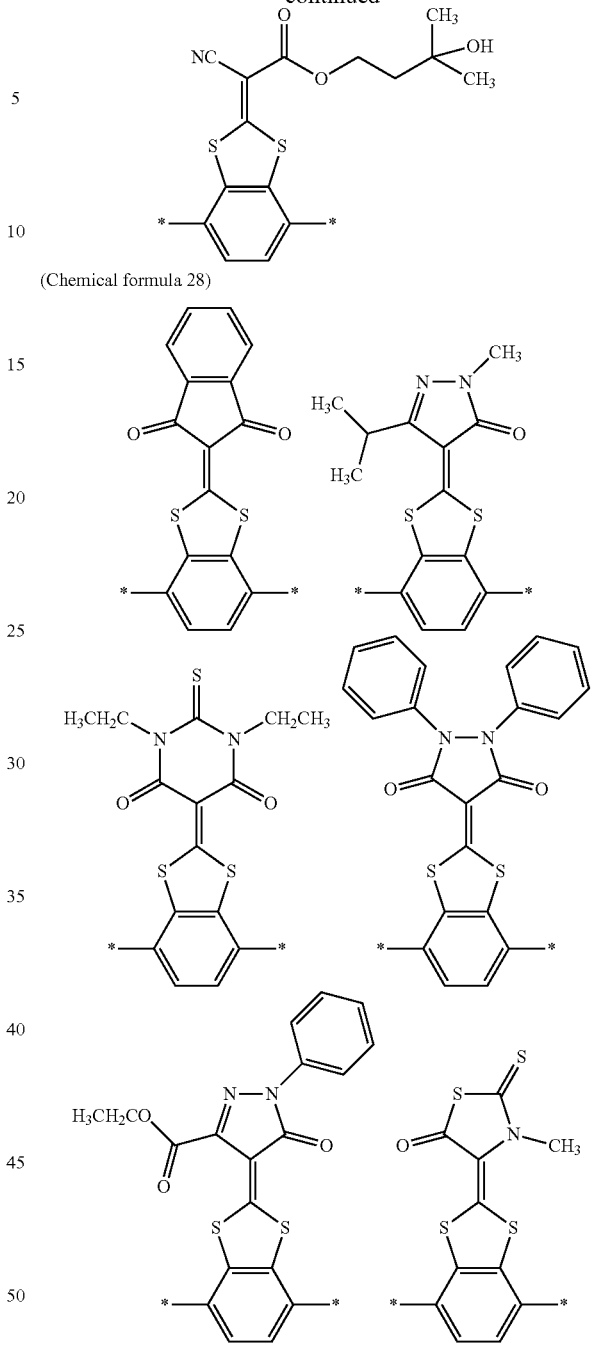

(Chemical formula 28)

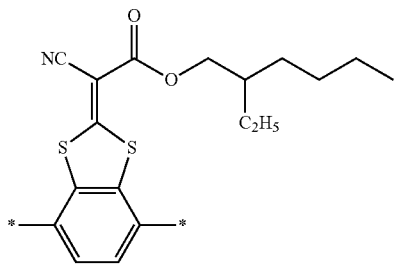

In the formula (I), $Z^1$ and $Z^2$ each independently represent one selected from the group consisting of a single bond, —O—, —O—CH$_2$—, —CH$_2$—O—, —O—CH$_2$—CH$_2$—, —CH$_2$—CH$_2$—O—, —C(=O)—O—, —O—C(=O)—, —C(=O)—S—, —S—C(=O)—, —NR$^{21}$—C(=O)—, —C(=O)—NR$^{21}$—, —CF$_2$—O—, —O—CF$_2$—, —CH$_2$—CH$_2$—, —CF$_2$—CF$_2$—, —O—CH$_2$—CH$_2$—O—, —CH=CH—C(=O)—O—, —O—C(=O)—CH=CH—, —CH$_2$—C(=O)—O—, —O—C(=O)—CH$_2$—, —CH$_2$—O—C(=O)—, —C(=O)—O—CH$_2$—, —CH$_2$—CH$_2$—C(=O)—O—, —O—C(=O)—CH$_2$—CH$_2$—, —CH$_2$—CH$_2$—O—C(=O)—, —C(=O)—O—CH$_2$—CH$_2$—, —CH=CH—, —N=CH—, —CH=N—, —N=C(CH$_3$)—, —C(CH$_3$)=N—, —N=N—, and —C≡C—.

Each R²¹ independently represents a hydrogen atom or an alkyl group of 1 to 6 carbon atoms.

In the formula (I), A¹, A², B¹, and B² each independently represent a group selected from the group consisting of a cyclic aliphatic group optionally having a substituent, and an aromatic group optionally having a substituent. The numbers of carbon atoms of the respective groups represented by A¹, A², B¹, and B² (including the number of carbon atoms of the substituent) are each independently usually 3 to 100. Among these, A¹, A², B¹, and B² are each independently a cyclic aliphatic group of 5 to 20 carbon atoms optionally having a substituent, or an aromatic group of 2 to 20 carbon atoms optionally having a substituent.

Examples of the cyclic aliphatic groups in A¹, A², B¹ and B² may include a cycloalkanediyl group of 5 to 20 carbon atoms such as a cyclopentane-1,3-diyl group, a cyclohexane-1,4-diyl group, a cycloheptane-1,4-diyl group, and a cyclooctane-1,5-diyl group; and a bicycloalkanediyl group of 5 to 20 carbon atoms such as a decahydronaphthalene-1,5-diyl group and a decahydronaphthalene-2,6-diyl group. Among these, an optionally substituted cycloalkanediyl group of 5 to 20 carbon atoms is preferable, a cyclohexanediyl group in more preferable, and a cyclohexane-1,4-diyl group is particularly preferable. The cyclic aliphatic group may be a trans-isomer, a cis-isomer, or a mixture of a cis-isomer and a trans-isomer. Among these, a trans-isomer is more preferable.

Examples of the substituent that the cyclic aliphatic groups in A¹, A², B¹, and B² may have may include a halogen atom, an alkyl group of 1 to 6 carbon atoms, an alkoxy group of 1 to 5 carbon atoms, a nitro group, and a cyano group. The number of substituents may be one or plural. The plurality of substituents may be the same as or different from one another.

Examples of the aromatic group in A¹, A², B¹, and B² may include an aromatic hydrocarbon ring group of 6 to 20 carbon atoms such as a 1,2-phenylene group, a 1,3-phenylene group, a 1,4-phenylene group, a 1,4-naphthylene group, a 1,5-naphthylene group, a 2,6-naphthylene group, and a 4,4'-biphenylene group; and an aromatic heterocyclic ring group of 2 to 20 carbon atoms such as a furan-2,5-diyl group, a thiophene-2,5-diyl group, a pyridine-2,5-diyl group, and a pyrazine-2,5-diyl group. Among these, an aromatic hydrocarbon ring group of 6 to 20 carbon atoms is preferable, a phenylene group is more preferable, and a 1,4-phenylene group is particularly preferable.

Examples of the substituent that the aromatic groups in A¹, A², B1 and B² may have may include the same examples as those of the substituent that the cyclic aliphatic groups in A¹, A², B¹ and B² may have. The number of substituents may be one or plural. The plurality of substituents may be the same as or different from one another.

In the formula (I), Y¹ to Y⁴ each independently represent one selected from the group consisting of a single bond, —O—, —C(=O)—, —C(=O)—O—, —O—C(=O)—, —NR²²—C(=O)—, —C(=O)—NR²²—, —O—C(=O)—O—, —NR²²—C(=O)—O—, —O—C(=O)—NR²²—, and —NR²²—C(=O)—NR²³—. R²² and R²³ each independently represent a hydrogen atom or an alkyl group of 1 to 6 carbon atoms.

In the formula (I), G¹ and G² each independently represent an organic group selected from the group consisting of an aliphatic hydrocarbon group of 1 to 20 carbon atoms; and a group in which one or more of the methylene groups (—CH₂—) contained in the aliphatic hydrocarbon group of 3 to 20 carbon atoms is substituted with —O— or —C(=O)—. The hydrogen atom contained in the organic group of G¹ and G² may be substituted with an alkyl group of 1 to 5 carbon atoms, an alkoxy group of 1 to 5 carbon atoms, or a halogen atom, with a proviso that the methylene groups (—CH₂—) at both ends of G¹ and G² are not substituted with —O— or —C(=O)—.

Specific examples of the aliphatic hydrocarbon group of 1 to 20 carbon atoms in G¹ and G² may include an alkylene group of 1 to 20 carbon atoms.

Specific examples of the aliphatic hydrocarbon group of 3 to 20 carbon atoms in G¹ and G² may include an alkylene group of 3 to 20 carbon atoms.

In the formula (I), P¹ and P² each independently represent a polymerizable group. Examples of the polymerizable group in P¹ and P² may include a group represented by CH₂=CR³¹—C(=O)—O— such as an acryloyloxy group and a methacryloyloxy group; a vinyl group; a vinyl ether group; a p-stilbene group; an acryloyl group; a methacryloyl group; a carboxyl group; a methylcarbonyl group; a hydroxyl group; an amido group; an alkylamino group of 1 to 4 carbon atoms; an amino group; an epoxy group; an oxetanyl group; an aldehyde group; an isocyanate group; and a thioisocyanate group. R³¹ represents a hydrogen atom, a methyl group, or a chlorine atom. Among these, a group represented by CH₂=CR³¹—C(=O)—O— is preferable, CH₂=CH—C(=O)—O— (an acryloyloxy group) and CH₂=C(CH₃)—C(=O)—O— (a methacryloyloxy group) are more preferable, and an acryloyloxy group is particularly preferable.

In the formula (I), p and q each independently represent 0 or 1.

The liquid crystal compound represented by the formula (I) may be produced, for example, by a reaction of a hydrazine compound with a carbonyl compound as described in International Publication No. 2012/147904.

Specific examples of the liquid crystal compound represented by the formula (I) may include compounds represented by the following formulas.

(Chemical formula 29)

(A-1)

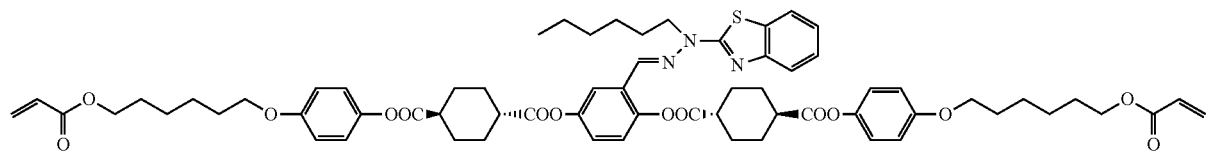

-continued
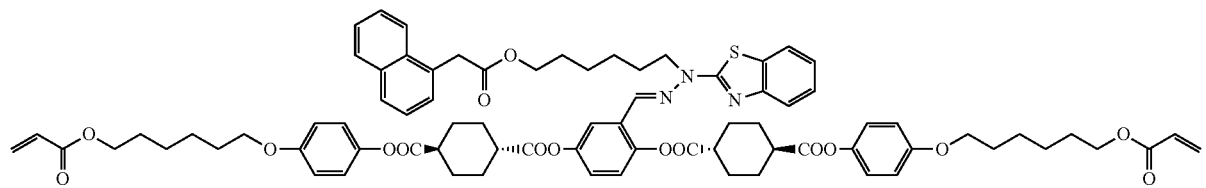
(A-2)
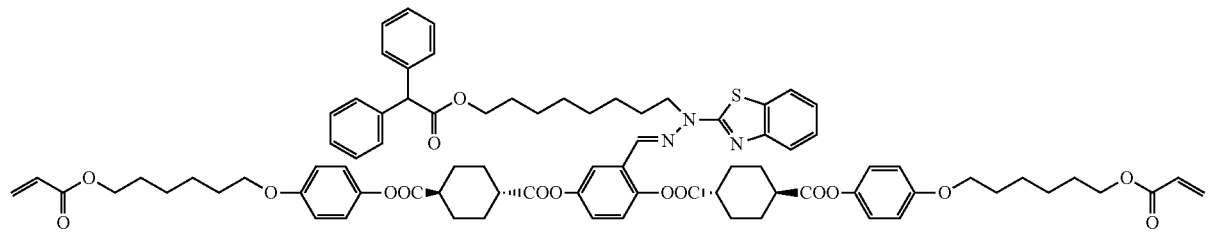
(A-3)
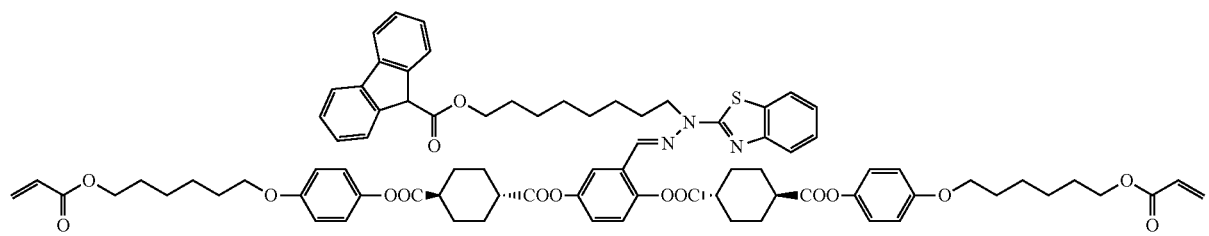
(A-4)
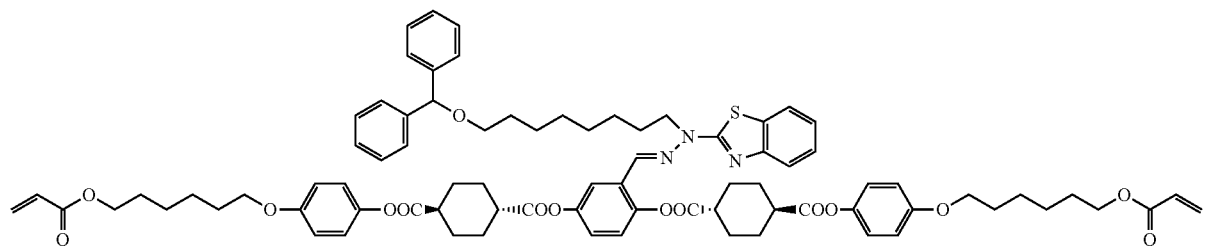
(A-5)
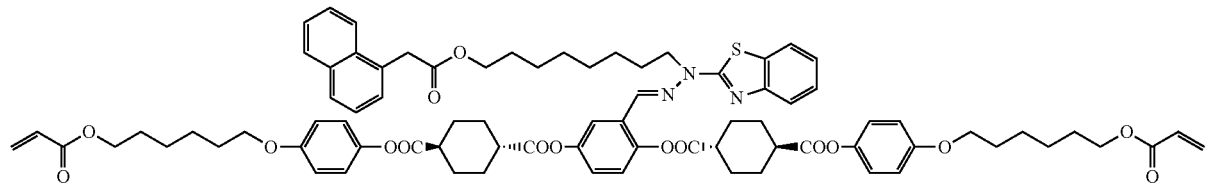
(A-6)
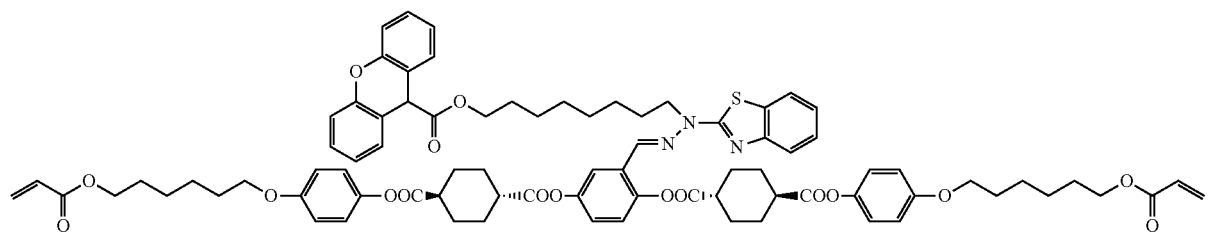
(A-7)

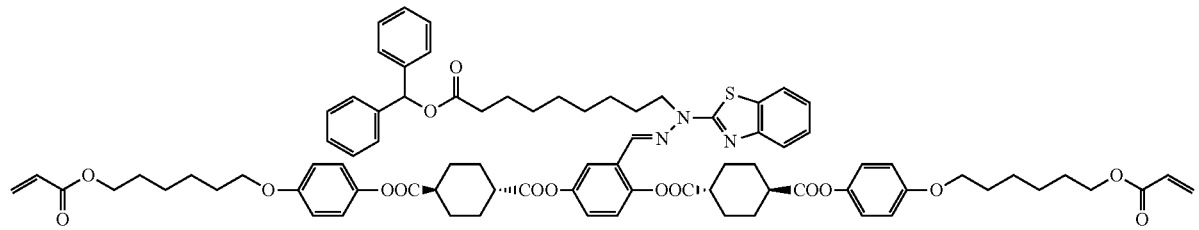

(A-8)

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

Reference Example 1: Liquid Crystal Compound (A): Liquid Crystal Phase and Phase Transition Temperature Each of a polymerizable liquid crystal compound having a structure represented by the aforementioned formula (A-1) (hereinafter, referred to as a "liquid crystal compound (A-1)") and a polymerizable liquid crystal compound having a structure represented by the aforementioned formula (A-2) (hereinafter, referred to as a "liquid crystal compound (A-2)") were subjected to temperature increase and decrease, and the liquid crystal phase was observed. As a result, it was found that the liquid crystal compound (A-1) is a composition capable of exhibiting only a nematic liquid crystal phase as a liquid crystal phase and can be used as the liquid crystal compound (A-N). On the other hand, it was found that the liquid crystal compound (A-2) is a compound capable of exhibiting a smectic liquid crystal phase as a low-temperature-side liquid crystal phase and a nematic liquid crystal phase as a high-temperature-side liquid crystal phase during both temperature increase and decrease and can be used as the liquid crystal compound (A-SmN).

Furthermore, the liquid crystal compound (A-2) was analyzed by differential scanning calorimetry (DSC). As a result, it was found that a peak was observed at 39.9° C. in temperature increase and at 37.4° C. in temperature decrease, and the phase transition between a smectic liquid crystal phase and a nematic liquid crystal phase occurs at these temperatures.

Reference Example 2: Substrate for Producing Optically Anisotropic Layer

A film made of a thermoplastic norbornene resin was stretched to impart a film orientation regulating force, thereby obtaining a substrate for producing an optically anisotropic layer.

Reference Example 3

Liquid crystal compositions (A-1) and (A-2) were obtained by mixing 19.42 parts of a liquid crystal compound (liquid crystal compound (A-1) or liquid crystal compound (A-2)), 1.94 parts of a crosslinking agent (tricyclodecanedimethanol diacrylate; "NK Ester A-DCP" manufactured by Shin-Nakamura Chemical Co., Ltd.), 0.06 part of a surfactant ("Megaface F-562" manufactured by DIC Corporation), 0.85 part of a photopolymerization initiator ("Irgacure OXE03" manufactured by BASF), 0.02 part of an antioxidant (2,6-di-t-butyl-p-cresol; BHT), and 77.71 parts of a mixed solvent of 1,3-dioxolane and cyclopentanone (1,3-dioxolane:cyclopentanone=60:40 (weight ratio)).

(R3-1. A-1N(1))

The liquid crystal composition (A-1) was applied onto a substrate (produced in Reference Example 2. The same applies hereinafter). The solvent was volatilized, and orientation treatment into a nematic liquid crystal phase was effected at 70° C., thereby forming a coating film of the liquid crystal composition was formed. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition. Then, the coating film was peeled off from the substrate to obtain an optically anisotropic layer (A-1N(1)) as a film with a thickness of 2.5 m.

(R3-2. A-2N(1))

The liquid crystal composition (A-2) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition. Then, the coating film was peeled off from the substrate to obtain an optically anisotropic layer (A-2N(1)) as a film with a thickness of 2.5 m.

(R3-3. A-2Sm(1))

The liquid crystal composition (A-2) was applied onto a substrate. The solvent was volatilized, and orientation treatment into a smectic liquid crystal phase was effected at 30° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition. Then, the coating film was peeled off from the substrate to obtain an optically anisotropic layer (A-2Sm(1)) as a film with a thickness of 2.5 m.

For each of the optically anisotropic layers (A-1N(l)), (A-2N(1)), and (A-2Sm(1)), the in-plane direction retardation Re was measured at various wavelengths. Thereafter, the optically anisotropic layer was placed in an oven at 85° C. for 50 hours, and the Re was measured again.

From the Re value Re0 before treatment and the Re value Re1 after treatment at a wavelength of 590 nm, the Re drop value ReD (%) was calculated according to the formula ReD=((Re1−Re0)/Re0)×100.

Furthermore, the Re(450)/Re(550) values before and after treatment were calculated. The results are as follows.

Optically anisotropic layer (A-1N(1)); Re drop −3.0%, Re(450)/Re(550) 0.83 before treatment, 0.81 after treatment Optically anisotropic layer (A-2N(1)); Re drop −3.0%, Re(450)/Re(550) 0.83 before treatment, 0.81 after treatment)

Optically anisotropic layer (A-2Sm(1)); Re drop −2.0%, Re(450)/Re(550) 0.71 before treatment, 0.75 after treatment As understood from these results, the optically anisotropic layer obtained from the liquid crystal compound (A-2) caused a negative Re drop and a decrease in Re(450)/Re (550) when the liquid crystal compound (A-2) was fixed in a state in which a nematic liquid crystal phase was exhibited, and a positive Re drop and a decrease in Re(450)/Re(550) when the liquid crystal compound (A-2) was fixed in a state in which a smectic liquid crystal phase was exhibited. Thus, it is understood that a highly durable optically anisotropic multi-layered product can be obtained by adopting a configuration in which these negate each other.

Example 1

The liquid crystal composition (A-2) was applied onto a substrate. The solvent was volatilized, and orientation treatment into a smectic liquid crystal phase was effected at 30° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E1-1 having a layer configuration of (substrate)/(optically anisotropic layer (A-2Sm(2)). The thickness of the optically anisotropic layer (A-2Sm(2)) was 1.27 m. Re(590) of the optically anisotropic layer (A-2Sm(2)) was 72.5 nm.

The liquid crystal composition (A-2) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E1-2 having a layer configuration of (substrate)/(optically anisotropic layer (A-2N(2)). The thickness of the optically anisotropic layer (A-2N(2)) was 1.26 m. Re(590) of the optically anisotropic layer (A-2N(2)) was 73.1 nm.

The surface of the multi-layered product E1-1 on a side with the optically anisotropic layer was bonded to a surface of a glass plate with a tackiness agent layer (trade name "CS98611US" manufactured by Nitto Denko Corporation) on a side with the tackiness agent layer. The layers other than the glass plate were peeled off from the glass plate to obtain a multi-layered product E1-3 having a layer configuration of (tackiness agent layer)/(optically anisotropic layer (A-2Sm (2))/(substrate).

The surface of the multi-layered product E1-2 on a side with the optically anisotropic layer was bonded to a surface of a glass plate with a tackiness agent layer on a side with the tackiness agent layer. Then, the substrate was peeled off to obtain a multi-layered product E1-4 having a layer configuration of (glass plate)/(tackiness agent layer)/(optically anisotropic layer (A-2N(2)).

The surface of the multi-layered product E1-3 on a side with the tackiness agent layer was bonded to the multi-layered product E1-4 on a side with the optically anisotropic layer. Then, the substrate was peeled off to obtain an optically anisotropic multi-layered product E1-5 having a layer configuration of (glass plate)/(tackiness agent layer)/ (optically anisotropic layer (A-2N(2))/(tackiness agent layer)/(optically anisotropic layer (A-2Sm (2)). In the bonding process, they were aligned so that the slow axis directions of the two optical anisotropic layers coincided with each other. Re(590) of the optically anisotropic multi-layered product E1-5 was 145.6 nm (The tackiness agent layer and the glass plate are isotropic layers, and the thicknesses of the tackiness agent layer and of the glass plate are not included in the thickness d in the calculation of the phase difference of optically anisotropic multi-layered products. The same shall apply hereinafter.). Re(450)/Re(550) of the optically anisotropic multi-layered product E1-5 was 0.77.

After the optically anisotropic multi-layered product E1-5 was heated in an oven at 85° C. for 50 hours, Re of the optically anisotropic multi-layered product E1-5 was measured again at room temperature. The Re drop value ReD (%) at the wavelength of 590 nm was determined to be −0.84%. Re(450)/Re(550) after heating was 0.78.

Example 2

The liquid crystal composition (A-2) was applied onto a substrate. The solvent was volatilized, and orientation treatment into a smectic liquid crystal phase was effected at 30° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E2-1 having a layer configuration of (substrate)/(optically anisotropic layer (A-2Sm(3)). The thickness of the optically anisotropic layer (A-2Sm(3)) was 1.28 μm. Re(590) of the optically anisotropic layer (A-2Sm(3)) was 74.3 nm.

The liquid crystal composition (A-2) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E2-2 having a layer configuration of (substrate)/(optically anisotropic layer (A-2N(3)). The thickness of the optically anisotropic layer (A-2N(3)) was 1.22 μm. Re(590) of the optically anisotropic layer (A-2N(3)) was 71.2 nm.

The surface of the multi-layered product E2-2 on a side with the optically anisotropic layer was bonded to a surface of a glass plate with a tackiness agent layer on a side with the tackiness agent layer. The layers other than the glass plate were peeled off from the glass plate to obtain a multi-layered product E2-3 having a layer configuration of (tackiness agent layer)/(optically anisotropic layer (A-2N (3))/(substrate).

The surface of the multi-layered product E2=1 on a side with the optically anisotropic layer was bonded to a surface of a glass plate with a tackiness agent layer on a side with the tackiness agent layer. Then, the substrate was peeled off to obtain a multi-layered product E2-4 having a layer configuration of (glass plate)/(tackiness agent layer)/(optically anisotropic layer (A-2Sm(3)).

The surface of the multi-layered product E2-3 on a side with the tackiness agent layer was bonded to the multi-layered product E2-4 on a side with the optically anisotropic layer. Then, the substrate was peeled off to obtain an optically anisotropic multi-layered product E2-5 having a layer configuration of (glass plate)/(tackiness agent layer)/(optically anisotropic layer (A-2Sm(3))/(tackiness agent layer)/(optically anisotropic layer (A-2N(3)). In the bonding process, they were aligned so that the slow axis directions of the two optical anisotropic layers coincided with each other. Re (590) of the optically anisotropic multi-layered product E2-5 was 145.5 nm. Re(450)/Re(550) of the optically anisotropic multi-layered product E2-5 was 0.77.

After the optically anisotropic multi-layered product E2-5 was heated in an oven at 85° C. for 50 hours, Re of the optically anisotropic multi-layered product E2-5 was measured again at room temperature. The Re drop value ReD (%) at the wavelength of 590 nm was determined to be −0.93%. Re(450)/Re(550) after heating was 0.78.

Example 3

The liquid crystal composition (A-2) was applied onto a substrate. The solvent was volatilized, and orientation treatment into a smectic liquid crystal phase was effected at 30° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E3-1 having a layer configuration of (substrate)/(optically anisotropic layer (A-2Sm(4)). The thickness of the optically anisotropic layer (A-2Sm(4)) was 1.23 μm. Re(590) of the optically anisotropic layer (A-2Sm(4)) was 72.0 nm.

The liquid crystal composition (A-1) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product E3-2 having a layer configuration of (substrate)/(optically anisotropic layer (A-1N(4)). The thickness of the optically anisotropic layer (A-1N(4)) was 1.25 m. Re(590) of the optically anisotropic layer (A-1N(4)) was 73.5 nm.

The surface of the multi-layered product E3-1 on a side with the optically anisotropic layer was bonded to a surface of a glass plate with a tackiness agent layer on a side with the tackiness agent layer. The layers other than the glass plate were peeled off from the glass plate to obtain a multi-layered product E3-3 having a layer configuration of (tackiness agent layer)/(optically anisotropic layer (A-2Sm (4))/(substrate).

The surface of the multi-layered product E3-2 on a side with the optically anisotropic layer was bonded to a surface of a glass plate with a tackiness agent layer on a side with the tackiness agent layer. Then, the substrate was peeled off to obtain a multi-layered product E3-4 having a layer configuration of (glass plate)/(tackiness agent layer)/(optically anisotropic layer (A-1N(4)).

The surface of the multi-layered product E3-3 on a side with the tackiness agent layer was bonded to the multi-layered product E3-4 on a side with the optically anisotropic layer. Then, the substrate was peeled off to obtain an optically anisotropic multi-layered product E3-5 having a layer configuration of (glass plate)/(tackiness agent layer)/ (optically anisotropic layer (A-1N(4))/(tackiness agent layer)/(optically anisotropic layer (A-2Sm(4)). In the bonding process, they were aligned so that the slow axis directions of the two optical anisotropic layers coincided with each other. Re(590) of the optically anisotropic multi-layered product E3-5 was 145.5 nm. Re(450)/Re(550) of the optically anisotropic multi-layered product E3-5 was. 0.77.

After the optically anisotropic multi-layered product E3-5 was heated in an oven at 85° C. for 50 hours, Re of the optically anisotropic multi-layered product E3-5 was measured again at room temperature. The Re drop value ReD (%) at the wavelength of 590 nm was determined to be −0.85%. Re(450)/Re(550) after heating was 0.78.

Comparative Example 1

The liquid crystal composition (A-2) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm$^2$ (irradiation intensity of 350 mW/cm$^2$, irradiation time of 2 seconds) in a nitrogen atmosphere to cure the coating film of the liquid crystal composition, thereby obtaining a multi-layered product CE1-1 having a layer configuration of (substrate)/(optically anisotropic layer (A-2N(5)). The thickness of the optically anisotropic layer (A-2N(5)) was 2.49 μm. Re(590) of the optically anisotropic layer (A-2N(5)) was 144.9 nm.

The surface of the multi-layered product CE1-1 on a side with the optically anisotropic Layer was bonded to a surface of a glass plate with a tackiness agent layer on a side with the tackiness agent layer. Then, the substrate was peeled off to obtain a multi-layered product CE1-2 having a layer configuration of (glass plate)/(tackiness agent layer)/(optically anisotropic layer (A-2N(5)). Re(450)/Re(550) of the multi-layered product CE1-2 was 0.83.

After the multi-layered product CE1-2 was heated in an oven at 85° C. for 50 hours, Re of the multi-layered product CE1-2 was measured again at room temperature. The Re drop value ReD (%) at the wavelength of 590 nm was determined to be −3.07%. Re(450)/Re(550) after heating was 0.81.

Comparative Example 2

The liquid crystal composition (A-2) was applied onto a substrate. The solvent was volatilized, and orientation treatment into a smectic liquid crystal phase was effected at 30° C., thereby forming a coating film of the liquid crystal composition. This coating film was irradiated with ultraviolet rays at an integrated illuminance of 700 mJ/cm² (irradiation intensity of 350 mW/cm², irradiation time of 2 seconds) in a nitrogen atmosphere to cure the coating film of the liquid crystal composition, thereby obtaining a multi-layered product CE2-1 having a layer configuration of (substrate)/(optically anisotropic layer (A-2Sm(6)). The thickness of the optically anisotropic layer (A-2Sm(6)) was 2.51 m. Re(590) of the optically anisotropic layer (A-2Sm(6)) was 144.7 nm.

The surface of the multi-layered product CE2-1 on a side with the optically anisotropic layer was bonded to a surface of a glass plate with a tackiness agent layer on a side with the tackiness agent layer. Then, the substrate was peeled off to obtain a multi-layered product CE2-2 having a layer configuration of (glass plate)/(tackiness agent layer)/(optically anisotropic layer (A-2Sm(6)). Re(450)/Re(550) of the multi-layered product CE2-2 was. 0.71.

After the multi-layered product CE2-2 was heated in an oven at 85° C. for 50 hours, Re of the multi-layered product CE2-2 was measured again at room temperature. The Re drop value ReD (%) at the wavelength of 590 nm was determined to be 2.03%. Re(450)/Re(550) after heating was 0.75.

Comparative Example 3

The liquid crystal composition (A-1) was applied onto a substrate. The solvent was volatilized, and orientation treatment into a nematic liquid crystal phase was effected at 70° C., thereby forming a coating film of the liquid crystal composition. This coating film was irradiated with ultraviolet rays at an integrated illuminance of 700 mJ/cm² (irradiation intensity of 350 mW/cm², irradiation time of 2 seconds) in a nitrogen atmosphere to cure the coating film of the liquid crystal composition, thereby obtaining a multi-layered product CE3-1 having a layer configuration of (substrate)/(optically anisotropic layer (A-1N(7)). The thickness of the optically anisotropic layer (A-1N(7)) was 2.50 m. Re(590) of the optically anisotropic layer (A-1N(7)) was 145.4 nm.

The surface of the multi-layered product CE3-1 on a side with the optically anisotropic layer was bonded to a surface of a glass plate with a tackiness agent layer on a side with the tackiness agent layer. Then, the substrate was peeled off to obtain a multi-layered product CE3-2 having a layer configuration of (glass plate)/(tackiness agent layer)/(optically anisotropic layer (A-1N(7)). Re(450)/Re(550) of the multi-layered product CE3-2 was 0.83.

After the multi-layered product CE3-2 was heated in an oven at 85° C. for 50 hours, Re of the multi-layered product CE3-2 was measured again at room temperature. The Re drop value ReD (%) at the wavelength of 590 nm was' determined to be −2.97%. Re(450)/Re(550) after heating was 0.81.

The results of Examples and Comparative Examples are summarized in Table 1

TABLE 1

| | Layer structure | Thickness lower side | Re (590) lower side | Thickness upper side | Re (590) upper side | Re (590) multi layer | ReD | Re(450)/Re(550) 0 h | Re(450)/Re(550) 50 h |
|---|---|---|---|---|---|---|---|---|---|
| Ex. 1 | g/a/A2N/a/A2Sm | 1.26 | 73.1 | 1.27 | 72.5 | 145,6 | −0.84 | 0.77 | 0.78 |
| Ex. 2 | g/a/A2Sm/a/A2N | 1.28 | 74.3 | 1.22 | 71.2 | 145.5 | −0.93 | 0.77 | 0.78 |
| Ex. 3 | g/a/A1N/a/A2Sm | 1.25 | 73.5 | 1.23 | 72.0 | 145,5 | −0.85 | 0.77 | 0.78 |
| Comp. Ex. 1 | g/a/A2N | 2.49 | 144.9 | — | — | — | −3.07 | 0.83 | 0.81 |
| Comp. Ex. 2 | g/a/A2Sm | 2.51 | 144.7 | — | — | — | 2.02 | 0.71 | 0.75 |
| Comp. Ex. 3 | g/a/AiN | 2.50 | 145.4 | — | — | — | −2.97 | 0.83 | 0.81 |

Layer configuration: Layer configuration of the object of which ReD and Re(450)/Re(550) are to be measured. g: glass plate, a: tackiness agent layer, AlN: nematic optically anisotropic layer prepared using liquid crystal composition (A-1), A2N: nematic optically anisotropic layer prepared using liquid crystal composition (A-2), A2Sm: smectic optically anisotropic layer prepared using liquid crystal composition (A-2).

Lower side: The lower one of the two optically anisotropic layers in the multi-layered product in a state where the glass plate is disposed on the lower side.

Upper side: The upper one of the two optically anisotropic layers in the multi-layered product in a state where the glass plate is disposed on the lower side.

Re(450)/Re(550) 0 h: Re(450)/Re(550) before heating

Re (450)/Re(550) 50 h: Re(450)/Re(550) after heating

The unit of thickness is m. The unit of Re is nm. The unit of ReD is %.

As obvious from the results of Examples, the optically anisotropic multi-layered product according to the present invention including the optically anisotropic layer (Sm) and the optically anisotropic layer (N) exerts the effect of negating Re drops, so that the durability against heat load can be made higher than those of the multi-layered products of Comparative Examples.

The invention claimed is:

1. An optically anisotropic multi-layered product comprising an optically anisotropic layer (Sm), and an optically anisotropic layer (N), wherein:
   the optically anisotropic layer (Sm) is an optically anisotropic layer that contains a liquid crystal compound (A-Sm) fixed in a state in which a smectic liquid crystal phase is exhibited;
   the optically anisotropic layer (N) is an optically anisotropic layer that contains a liquid crystal compound (A-N) fixed in a state in which a nematic liquid crystal phase is exhibited; and
   the optically anisotropic layer (Sm) and the optically anisotropic layer (N) have a common in-plane slow axis direction.

2. The optically anisotropic multi-layered product according to claim 1, wherein:

the liquid crystal compound (A-Sm) and the liquid crystal compound (A-N) are the same liquid crystal compound (A-SmN); and the liquid crystal compound (A-SmN) is a compound that is capable of exhibiting a smectic liquid crystal phase and a nematic liquid crystal phase.

3. The optically anisotropic multi-layered product according to claim 2, wherein the liquid crystal compound (A-SmN) is a reverse wavelength dispersible polymerizable liquid crystal compound.

4. The optically anisotropic multi-layered product according to claim 3, wherein the liquid crystal compound (A-SmN) is a compound represented by the following formula (I):

(Chemical formula 1)

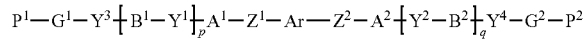

in the formula (I),

Ar represents a group represented by the following formula (III-2)

(Chemical formula 2)

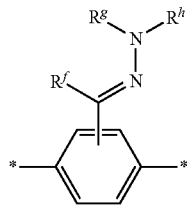

$R^f$ represents a group selected from a hydrogen atom and an alkyl group of 1 to 6 carbon atoms, $R^g$ represents a group selected from the group consisting of a hydrogen atom, and an organic group of 1 to 30 carbon atoms optionally having a substituent, $R^h$ represents an organic group having one or more aromatic rings selected from the group consisting of an aromatic hydrocarbon ring of 6 to 30 carbon atoms and an aromatic heterocyclic ring of 2 to 30 carbon atoms, $Z^1$ and $Z^2$ each independently represent one selected from the group consisting of a single bond, —O—, —O—CH$_2$—, —CH$_2$—O—, —O—CH$_2$—CH$_2$—, —CH$_2$—CH$_2$—O—, —C(=O)—O—, —O—C(=O)—, —C(=O)—S—, —S—C(=O)—, —NR$^{21}$—C(=O)—, —C(=O)—NR$^{21}$—, —CF$_2$—O—, —O—CF$_2$—, —CH$_2$—CH$_2$—, —CF$_2$—CF$_2$—, —O—CH$_2$—CH$_2$—O—, —CH=CH—C(=O)—O—, —O—C(=O)—CH=CH—, —CH$_2$—C(=O)—O—, —O—C(=O)—CH$_2$—, —CH$_2$—O—C(=O)—, C(=O)—O—CH$_2$—, —CH$_2$—CH$_2$—C(=O)—O—, —O—C(=O)—CH$_2$—CH$_2$—, —CH$_2$—CH$_2$—O—C(=O)—, —C(=O)—O—CH$_2$—CH$_2$—, —CH=CH—, —N=CH—, —CH=N—, —N=C(CH$_3$)—, —C(CH$_3$)=N—, —N=N—, and —C≡C—, and $R^{21}$ each independently represents a hydrogen atom or an alkyl group of 1 to 6 carbon atoms, $A^1$, $A^2$, $B^1$, and $B^2$ each independently represent a group selected from the group consisting of a cyclic aliphatic group optionally having a substituent, and an aromatic group optionally having a substituent, $Y^1$ to $Y^4$ each independently represent one selected from the group consisting of a single bond, —O—, —C(=O)—, —C(=O)—O—, —O—C(=O)—, —NR$^{22}$—C(=O)—, —C(=O)—NR$^2$—, —O—C(=O)—O—, —NR$^{22}$—C(=O)—O—, —O—C(=O)—NR$^2$—, and —NR$^{22}$—C(=O)—NR$^{23}$—, and $R^{22}$ and $R^{23}$ each independently represent a hydrogen atom or an alkyl group of 1 to 6 carbon atoms, $G^1$ and $G^2$ each independently represent an organic group selected from the group consisting of an aliphatic hydrocarbon group of 1 to 20 carbon atoms; and a group in which one or more of methylene groups (—CH$_2$—) contained in an aliphatic hydrocarbon group of 3 to 20 carbon atoms is substituted with —O— or —C(=O)—, the hydrogen atom contained in the organic group of $G^1$ and $G^2$ is optionally substituted with an alkyl group of 1 to 5 carbon atoms, an alkoxy group of 1 to 5 carbon atoms, or a halogen atom, with a proviso that methylene groups (—CH$_2$—) at both ends of $G^1$ and $G^2$ are not substituted with —O— or —C(=O)—, $P^1$ and $P^2$ each independently represent a polymerizable group, and p and q each independently represent 0 or 1.

5. The optically anisotropic multi-layered product according to claim 4, wherein the liquid crystal compound (A-SmN) is a compound represented by the following formula (A-2):

(Chemical formula 3)

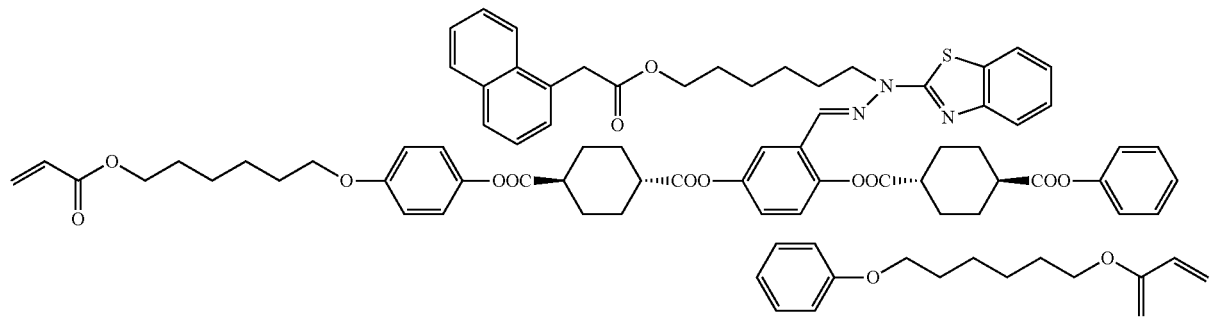

(A-2)

6. A method for producing the optically anisotropic multi-layered product according to claim 1, comprising the steps of:
- curing a liquid crystal composition (Sm) containing the liquid crystal compound (A-Sm) in a state in which a smectic liquid crystal phase is exhibited to obtain the optically anisotropic layer (Sm);
- curing a liquid crystal composition (N) containing the liquid crystal compound (A-N) in a state in which a nematic liquid crystal phase is exhibited to obtain the optically anisotropic layer (N); and
- bonding the optically anisotropic layer (Sm) and the optically anisotropic layer (N) together.

* * * * *